US012632937B2

(12) United States Patent
Yamamoto

(10) Patent No.: US 12,632,937 B2
(45) Date of Patent: May 19, 2026

(54) INFORMATION PROCESSING DEVICE, METHOD AND STORAGE MEDIUM FOR RECONSTRUCTING AN IMAGE INCLUDING AN INTERFERENCE FRINGE IMAGE USING LOCAL AREA INFORMATION

(71) Applicant: FUJIFILM Corporation, Tokyo (JP)

(72) Inventor: Hiroaki Yamamoto, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 571 days.

(21) Appl. No.: 18/068,874

(22) Filed: Dec. 20, 2022

(65) Prior Publication Data

US 2023/0121438 A1 Apr. 20, 2023

Related U.S. Application Data

(63) Continuation of application No. PCT/JP2021/019680, filed on May 24, 2021.

(30) Foreign Application Priority Data

Jun. 25, 2020 (JP) ................................. 2020-109802

(51) Int. Cl.
*G06T 5/73* (2024.01)
*G06T 5/50* (2006.01)
*G06T 7/00* (2017.01)

(52) U.S. Cl.
CPC .................. *G06T 5/73* (2024.01); *G06T 5/50* (2013.01); *G06T 7/0012* (2013.01);
(Continued)

(58) Field of Classification Search
CPC ........... G06T 5/73; G06T 5/50; G06T 7/0012; G06T 2207/20092; G06T 2207/30024; G06T 2207/30168
See application file for complete search history.

(56) References Cited

U.S. PATENT DOCUMENTS

2017/0168285 A1 6/2017 Ozcan et al.
2017/0277123 A1* 9/2017 Yasuda .................... G03H 1/30
2017/0322516 A1* 11/2017 Hsiao ................... G03H 1/0866

FOREIGN PATENT DOCUMENTS

CN 101349540 B * 6/2011
CN 109717961 A * 5/2019
(Continued)

OTHER PUBLICATIONS

Xia, P., Tahara, T., Kakue, T. et al. Performance comparison of bilinear interpolation, bicubic interpolation, and B-spline interpolation in parallel phase-shifting digital holography. Opt Rev 20, 193-197 (2013). https://doi.org/10.1007/s10043-013-0033-2 (Year: 2013) .*

(Continued)

*Primary Examiner* — Andrew M Moyer
*Assistant Examiner* — Conor A O'Malley
(74) *Attorney, Agent, or Firm* — Sughrue Mion, PLLC

(57) ABSTRACT

An information processing device that reconstructs an original image including an interference fringe image of at least one object to be observed is provided. The information processing device includes at least one processor that is configured to: acquire local area information representing a local area including the interference fringe image in the original image; generate a reconstructed image while changing a reconstruction position in the local area; calculate sharpness of the reconstructed image each time the reconstructed image is generated and detect an in-focus position where the sharpness is maximized; and output the reconstructed image at the in-focus position as an optimal reconstructed image.

11 Claims, 21 Drawing Sheets

(52) U.S. Cl.
    CPC .............. *G06T 2207/20092* (2013.01); *G06T*
                 *2207/30024* (2013.01); *G06T 2207/30168*
                                 (2013.01)

(56)             References Cited

FOREIGN PATENT DOCUMENTS

| | | | | | |
|----|----|---|---|---|---|
| JP | 2012176094 | A | * | 9/2012 | ........... A61B 3/1025 |
| JP | 2017-168602 | A | | 9/2017 | |
| TW | 578114 | B | * | 7/2002 | |
| WO | 2018/158810 | A1 | | 9/2018 | |
| WO | 2019/180810 | A1 | | 9/2019 | |

OTHER PUBLICATIONS

Extended European Search Report issued Oct. 20, 2023 in European Application No. 21827861.2.
International Search Report dated Aug. 10, 2021, issued in International Application No. PCT/JP2021/019680.
Written Opinion dated Aug. 10, 2021, issued in International Application No. PCT/JP2021/019680.
International Preliminary Report on Patentability (with translation of Written Opinion) dated Dec. 13, 2022, issued in International Application No. PCT/JP2021/019680.

* cited by examiner

FIG. 12

RECONSTRUCTION PROCESSING ~S1

ACQUIRE IMAGING CONDITION ~S10

ACQUIRE LOCAL AREA INFORMATION ~S11

EXTRACT LOCAL IMAGE FROM ORIGINAL IMAGE ~S12

GENERATE RECONSTRUCTED IMAGE ~S13

OUTPUT RECONSTRUCTED IMAGE ~S14

IN-FOCUS POSITION DETECTION PROCESSING ~S2

S15~ IS THERE STOP INSTRUCTION?    YES

NO

CHANGE RECONSTRUCTION POSITION ~S16

NO    FINAL LOCAL AREA? ~S17

YES

END

INFORMATION PROCESSING DEVICE, METHOD AND STORAGE MEDIUM FOR RECONSTRUCTING AN IMAGE INCLUDING AN INTERFERENCE FRINGE IMAGE USING LOCAL AREA INFORMATION

CROSS-REFERENCE TO RELATED APPLICATIONS

This application is a continuation application of International Application No. PCT/JP2021/019680, filed on May 24, 2021, which is incorporated herein by reference in its entirety. Further, this application claims priority from Japanese Patent Application No. 2020-109802, filed on Jun. 25, 2020, the disclosure of which is incorporated by reference herein in their entirety.

BACKGROUND

Technical Field

The technique of the present disclosure relates to an information processing device, and an operation method and a non-transitory storage medium storing an operation program.

Related Art

In order to reduce a size of a device that images a small object to be observed, such as a cell, so-called lens-free digital holography in which an optical-system component is eliminated is known. In the digital holography, the object to be observed is imaged by using a light source that emits coherent light such as a laser beam and one interference fringe image obtained by the imaging is reconstructed to generate a reconstructed image at a predetermined reconstruction position. In reconstruction processing, the reconstruction position, which is a distance from an imaging sensor in a light source direction, is used as a parameter.

In a case where the reconstruction position is not appropriate for the object to be observed, the obtained reconstructed image becomes unclear. Thus, in the reconstruction processing, it has been proposed to search for an in-focus position in which a clear reconstructed image can be obtained by using the reconstruction position as a parameter (refer to, for example, JP2017-168602A). The reconstruction position is a position corresponding to a focal length described in JP2017-168602A.

Further, in JP2017-168602A, in order to shorten a search time for the in-focus position, it has been proposed to specify the object to be observed in the reconstructed image and to limit a search range to a local area in which the specified object to be observed is present to search for the in-focus position.

In the technique described in JP2017-168602A, the object to be observed is specified based on the reconstructed image. Therefore, it is necessary to temporarily set the reconstruction position to generate an image as a primary reconstructed image for specifying the object to be observed. Since this primary reconstructed image is generated at the reconstruction position irrelevant to the in-focus position and has poor image quality, it is difficult to appropriately specify the area including the object to be observed. Therefore, in JP2017-168602A, filtering processing is performed to improve the image quality of the primary reconstructed image. When such filtering processing is performed, the calculation load increases and the search efficiency decreases.

SUMMARY

An object of the technique of the present disclosure is to provide an information processing device, and an operation method and a non-transitory storage medium storing an operation program capable of improving an efficiency of searching for an in-focus position.

In order to achieve the above object, an information processing device according to the present disclosure is an information processing device that reconstructs an original image including an interference fringe image of at least one object to be observed and comprises at least one processor. The processor executes local area information acquisition processing of acquiring local area information representing a local area including the interference fringe image in the original image, reconstruction processing of generating a reconstructed image while changing a reconstruction position in the local area, in-focus position detection processing of calculating sharpness of the reconstructed image each time the reconstructed image is generated by the reconstruction processing to detect an in-focus position where the sharpness is maximized, and optimal reconstructed image output processing of outputting the reconstructed image at the in-focus position as an optimal reconstructed image.

It is preferable that the processor, in a case where the local area information acquired by the local area information acquisition processing includes a plurality of the local areas, executes the reconstruction processing, the in-focus position detection processing, and the optimal reconstructed image output processing for each of the local areas.

It is preferable that the processor disposes the optimal reconstructed image output by the optimal reconstructed image output processing for each local area in a reference image to execute whole image generation processing of generating a whole image.

It is preferable that the reference image is the original image and the processor disposes the optimal reconstructed image in the corresponding local area in the original image to generate the whole image in the whole image generation processing.

It is preferable that the processor generates the reconstructed image based on an imaging condition under which the original image is captured in the reconstruction processing.

It is preferable that the imaging condition includes a wavelength of irradiation light with which the object to be observed is irradiated.

It is preferable that the imaging condition includes a position of the object to be observed.

It is preferable that the processor starts the change of the reconstruction position from an initial position in the reconstruction processing and stops the change of the reconstruction position to end the reconstruction processing in a case where one in-focus position is detected in the in-focus position detection processing.

It is preferable that the processor starts the change of the reconstruction position from the initial position in the reconstruction processing and ends the reconstruction processing in a case where the reconstruction position reaches a final position.

It is preferable that the processor, in a case where a plurality of the in-focus positions is detected for one local area in the in-focus position detection processing, outputs a plurality of the optimal reconstructed images for the one local area in the optimal reconstructed image output processing.

It is preferable that the processor acquires the local area information based on a setting operation of a user in the local area information acquisition processing.

It is preferable that the processor performs image analysis based on the original image to acquire the local area information in the local area information acquisition processing.

A method of operating an information processing device according to the present disclosure is a method of operating an information processing device that reconstructs an original image including an interference fringe image of at least one object to be observed. The method includes acquiring local area information representing a local area including the interference fringe image in the original image, generating a reconstructed image while changing a reconstruction position in the local area, calculating sharpness of the reconstructed image each time the reconstructed image is generated by the reconstruction processing to detect an in-focus position where the sharpness is maximized, and outputting the reconstructed image at the in-focus position as an optimal reconstructed image.

A non-transitory storage medium of the present disclosure stores an operation program that causes a computer to execute reconstruction processing of an original image including an interference fringe image of at least one object to be observed. The reconstruction processing includes: acquiring local area information representing a local area including the interference fringe image in the original image, generating a reconstructed image while changing a reconstruction position in the local area, calculating sharpness of the reconstructed image each time the reconstructed image is generated by the reconstruction processing to detect an in-focus position where the sharpness is maximized, and outputting the reconstructed image at the in-focus position as an optimal reconstructed image.

According to the technique of the present disclosure, it is possible to provide the information processing device, and the operation method and the non-transitory storage medium storing the operation program capable of improving the efficiency of searching for the in-focus position.

BRIEF DESCRIPTION OF THE DRAWINGS

FIG. 12 is a diagram for describing reconstruction processing.

DETAILED DESCRIPTION

An example of an embodiment according to the technique of the present disclosure will be described with reference to accompanying drawings.

Figure 1:
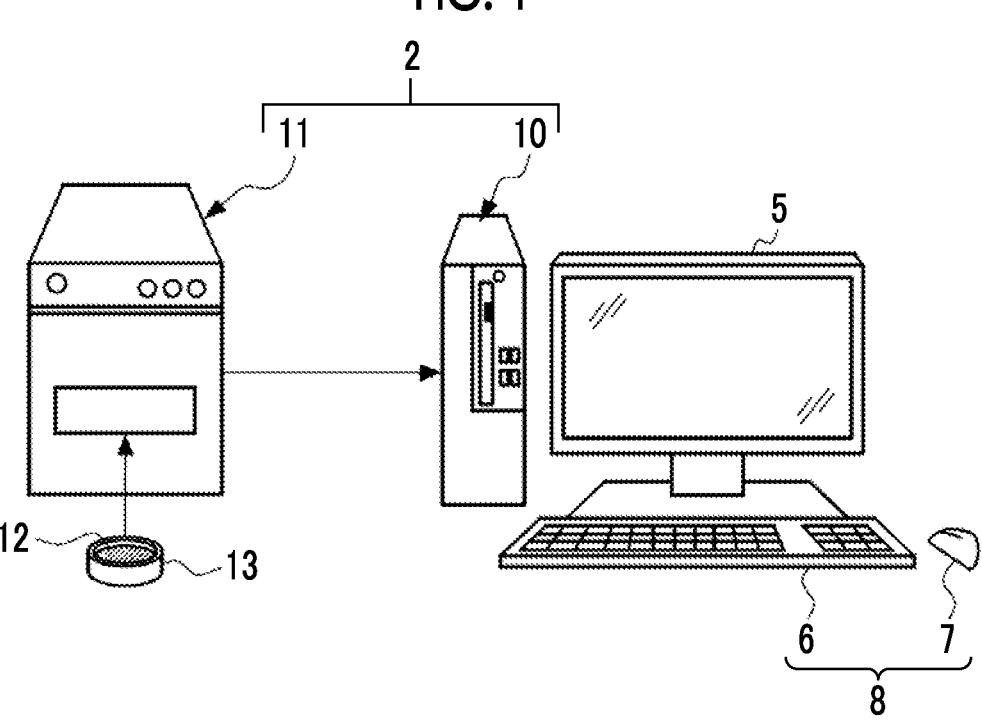
FIG. 1 is a diagram showing an example of a configuration of a digital holography system.

FIG. 1 shows an example of a configuration of a digital holography system 2. The digital holography system 2 is configured of an information processing device 10 and an imaging device 11. The imaging device 11 is connected to the information processing device 10. A culture vessel 13 of a cell 12 is inserted into the imaging device 11. The cell 12 is an example of an "object to be observed" according to the technique of the present disclosure.

The information processing device 10 is, for example, a desktop personal computer. A display 5, a keyboard 6, a mouse 7, and the like are connected to the information processing device 10. The keyboard 6 and the mouse 7 constitute an input device 8 for a user to input information. The input device 8 also includes a touch panel and the like.

Figure 2:
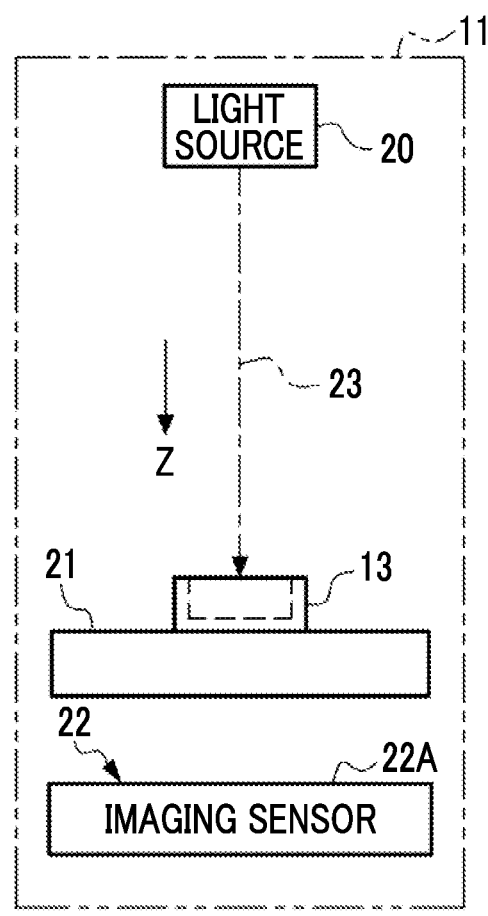
FIG. 2 is a diagram showing an example of a configuration of an imaging device.

FIG. 2 shows an example of a configuration of the imaging device 11. The imaging device 11 has a light source 20, a stage 21, and an imaging sensor 22. The light source 20 is, for example, a laser diode. The light source 20 may be configured by combining a light emitting diode and a pinhole. The stage 21 is transparent to light, and a culture vessel 13 is placed on the stage 21. The light source 20 irradiates irradiation light 23 toward the culture vessel 13 placed on the stage 21. The irradiation light 23 is coherent light. The irradiation light 23 is incident on the culture vessel 13, transmits through the culture vessel 13 and the stage 21, and then is incident on an imaging surface 22A of the imaging sensor 22. A Z direction indicated by an arrow is an irradiation direction of the irradiation light 23.

The imaging sensor 22 is configured of, for example, a monochrome complementary metal oxide semiconductor (CMOS) type image sensor. An imaging operation of the imaging sensor 22 is controlled by the information processing device 10. The imaging sensor 22 is disposed such that the imaging surface 22A is orthogonal to the Z direction.

Figure 3:
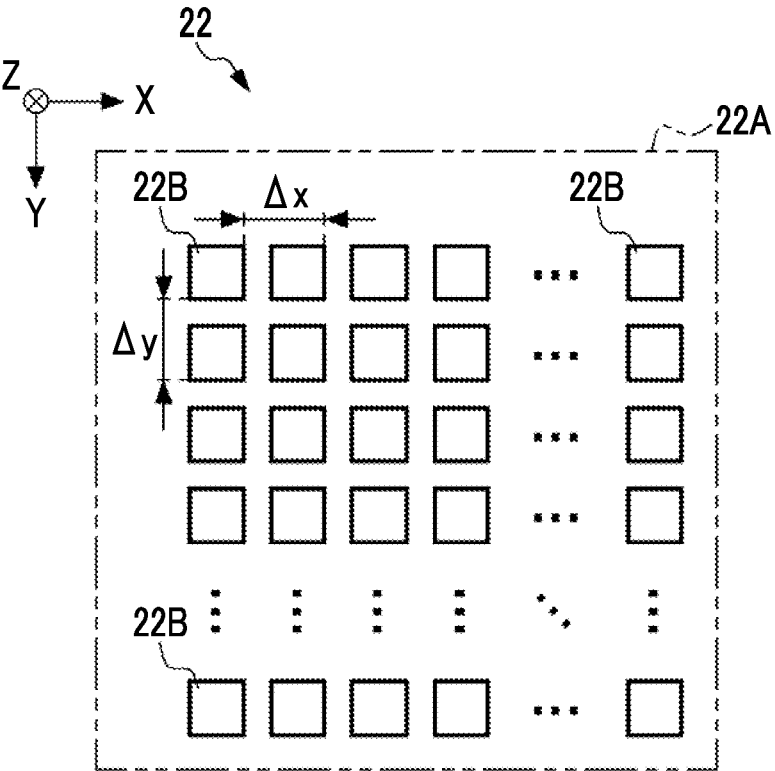
FIG. 3 is a diagram showing an example of a configuration of an imaging sensor.

FIG. 3 shows an example of a configuration of the imaging sensor 22. The imaging sensor 22 has a plurality of pixels 22B arranged on the imaging surface 22A. The pixel 22B is a photoelectric conversion element that performs photoelectric conversion of the incident light to output a pixel signal according to an amount of incident light.

The pixels 22B are arranged at equal pitches along an X direction and a Y direction. The arrangement of the pixels 22B is a so-called square arrangement. The X direction is a direction orthogonal to the Z direction. The Y direction is a direction orthogonal to the X direction and the Z direction. The pixels 22B are arranged in the X direction at a first arrangement pitch $\Delta x$ and in the Y direction at a second arrangement pitch $\Delta y$.

The imaging sensor 22 images the light incident on the imaging surface 22A and outputs image data configured of the pixel signal output from each of the pixels 22B. Hereinafter, the output of the image data is simply referred to as the output of the image.

Figure 4:
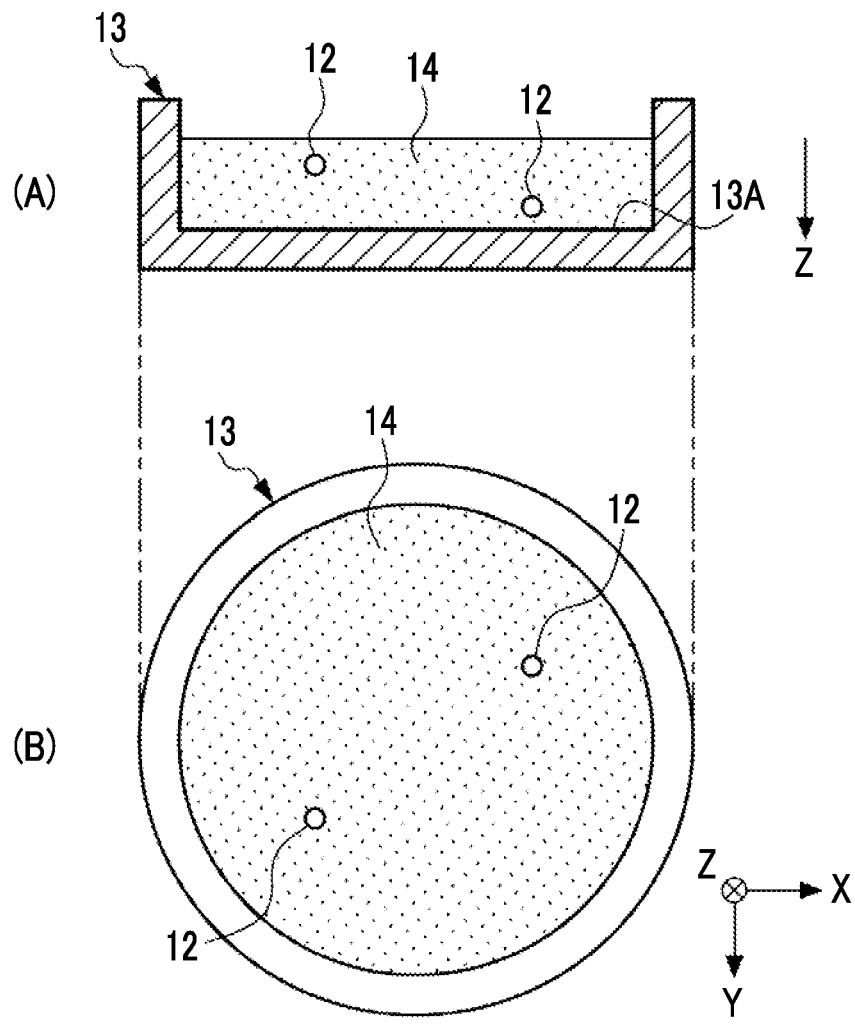
FIG. 4 is a diagram showing an example of a culture vessel.

FIG. 4 shows an example of the culture vessel 13. (A) of FIG. 4 is a cross-sectional view of the culture vessel 13 cut along a plane parallel to the Z direction. (B) of FIG. 4 is a plan view of the culture vessel 13 as viewed from the Z direction.

The culture vessel 13 is a vessel having a circular outer shape in a plan view, and for example, a culture medium solution 14 containing the cell 12 is injected into the culture vessel 13. The culture medium solution 14 injected into the culture vessel 13 may contain a plurality of cells 12. The irradiation light 23 is incident on the culture vessel 13 and diffracted by the cell 12, and thus an interference fringe image reflecting a shape of the cell 12 is generated. The interference fringe image is also referred to as a hologram image.

Figure 5:
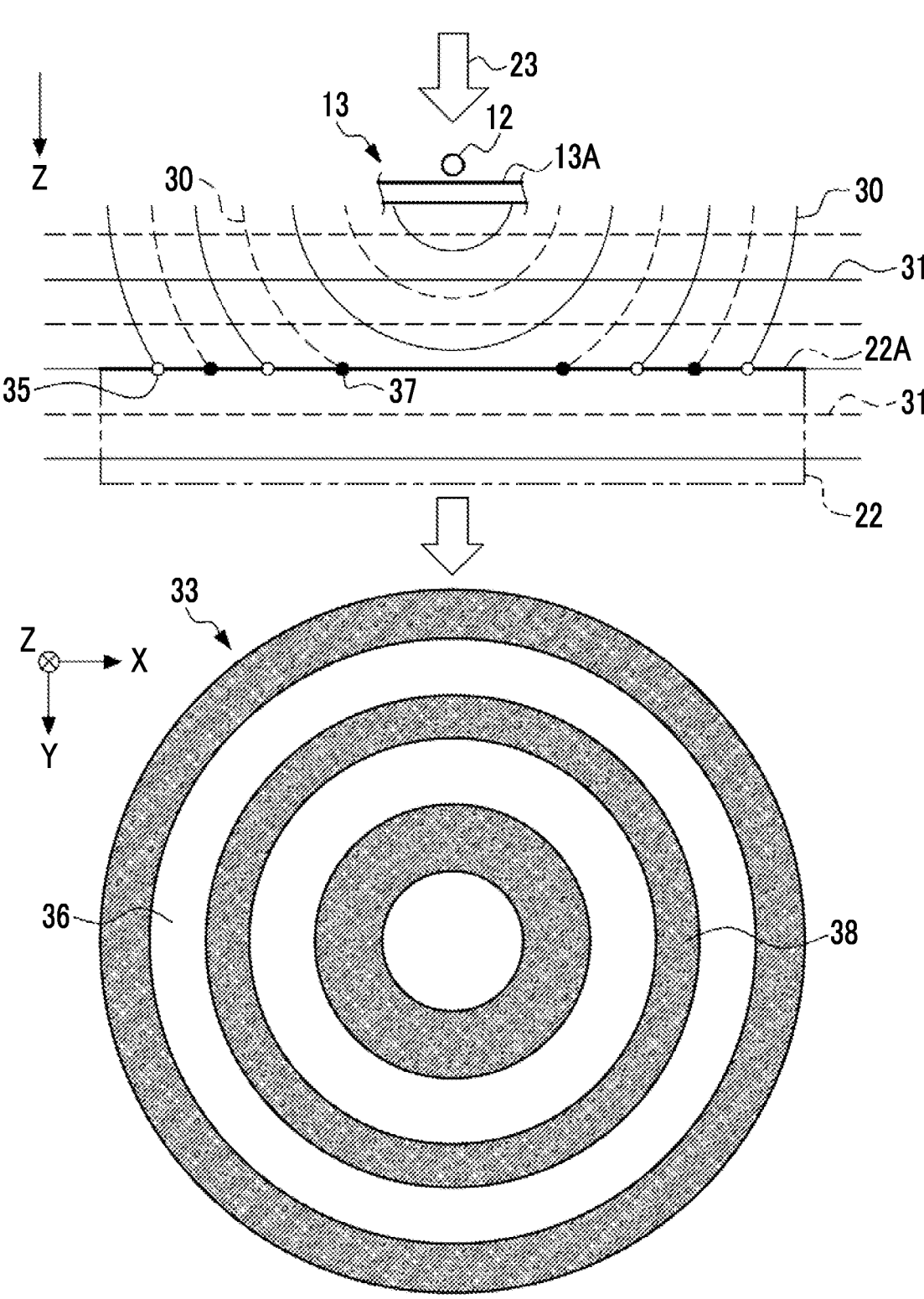
FIG. 5 is a diagram showing a state in which an interference fringe image is generated by a cell.

FIG. 5 shows a state in which an interference fringe image 33 is generated by the cell 12. A part of the irradiation light 23 incident on the culture vessel 13 is diffracted by the cell 12. That is, the irradiation light 23 is divided into diffracted light 30 diffracted by the cell 12 and transmitted light 31 that is not diffracted by the cell 12 and transmits through the culture vessel 13. The transmitted light 31 is a planar wave. The diffracted light 30 and the transmitted light 31 pass through a bottom surface 13A of the culture vessel 13 and are incident on the imaging surface 22A of the imaging sensor 22.

The diffracted light 30 and the transmitted light 31 interfere with each other to generate the interference fringe image 33. The interference fringe image 33 is configured of a bright portion 36 and a dark portion 38. In FIG. 5, the bright portion 36 and the dark portion 38 are illustrated in the interference fringe image 33 as circular portions, respectively. However, the shape of the interference fringe image 33 changes according to the shape and internal structure of the cell 12. The imaging sensor 22 captures an optical image including the interference fringe image 33 formed on the imaging surface 22A and outputs an original image OP (refer to FIG. 8) including the interference fringe image 33.

Figure 6:
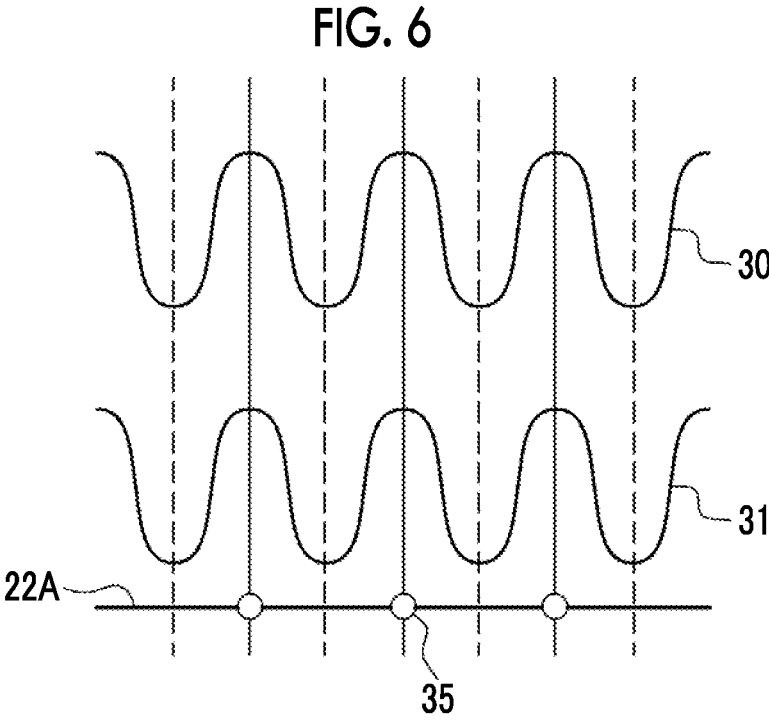
FIG. 6 is a diagram showing a wavefront in a case where diffracted light and transmitted light strengthen each other.
Figure 7:
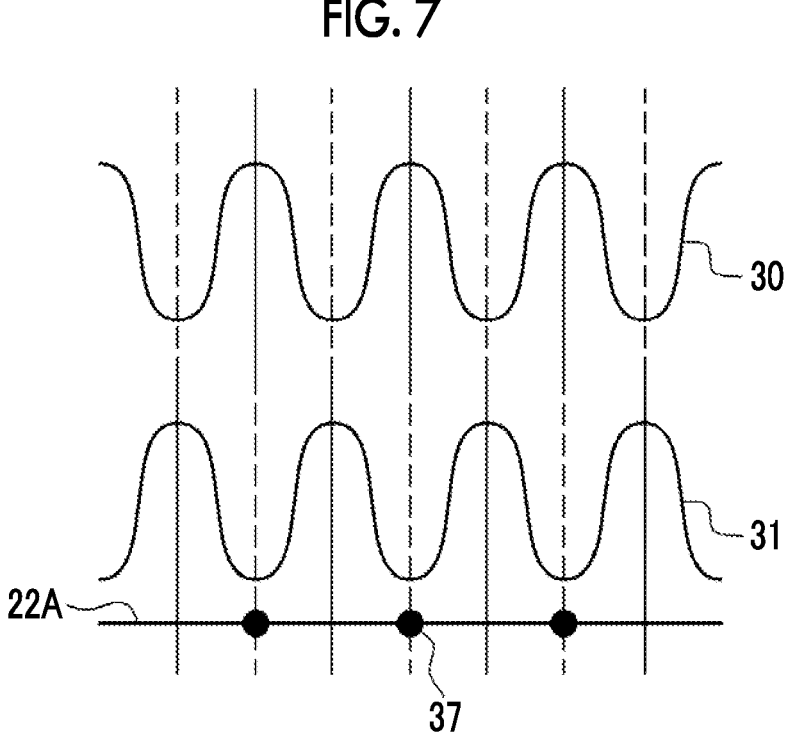
FIG. 7 is a diagram showing a wavefront in a case where diffracted light and transmitted light weaken each other.

FIGS. 6 and 7 show wavefronts of the diffracted light 30 and the transmitted light 31. FIG. 6 shows the wavefront in a case where the diffracted light 30 and the transmitted light 31 strengthen each other. FIG. 7 shows the wavefront in a case where the diffracted light 30 and the transmitted light 31 weaken each other. In FIGS. 6 and 7, solid lines indicate the wavefronts having a maximum amplitude of the diffracted light 30 and the transmitted light 31. On the contrary, broken lines indicate the wavefront having a minimum amplitude of the diffracted light 30 and the transmitted light 31.

In FIG. 6, a white spot 35 shown on the imaging surface 22A is a portion where the wavefronts of the diffracted light 30 and the transmitted light 31 are aligned and strengthen each other. The portion of the white spot 35 corresponds to the bright portion 36 (refer to FIG. 5) of the interference fringe image 33. In FIG. 7, a black spot 37 shown on the imaging surface 22A is a portion where the wavefronts of the diffracted light 30 and the transmitted light 31 are deviated by a half wavelength and weaken each other. The portion of the black spot 37 corresponds to the dark portion 38 (refer to FIG. 5) of the interference fringe image 33.

Figure 8:
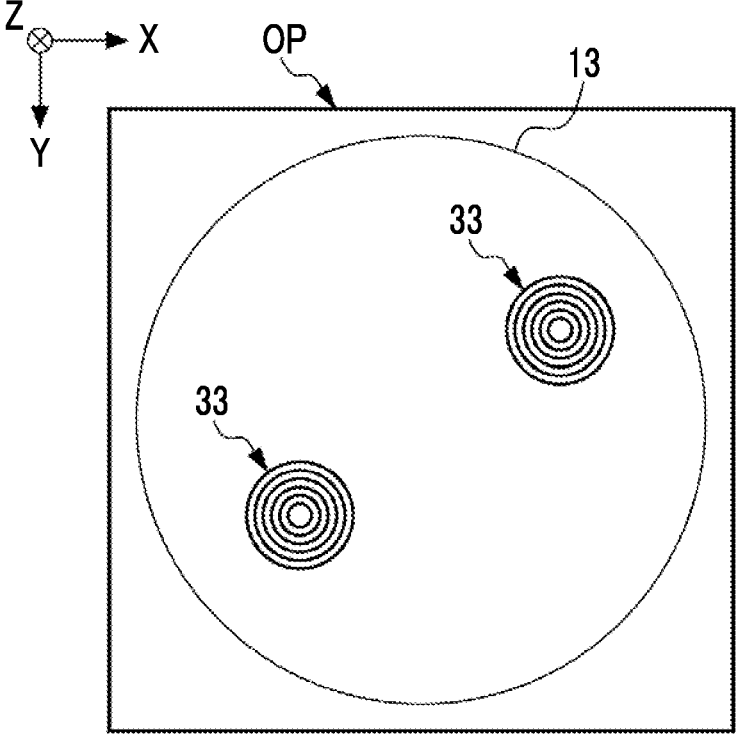
FIG. 8 is a diagram showing an example of an original image output from an imaging sensor.

FIG. 8 shows an example of the original image OP output from the imaging sensor 22. The original image OP shown in FIG. 8 illustrates a case where two cells 12 are present in the culture vessel 13 (refer to FIG. 4). The original image OP includes two interference fringe images 33 generated by the irradiation light 23 incident on the culture vessel 13 being diffracted by each cell 12.

Figure 9:
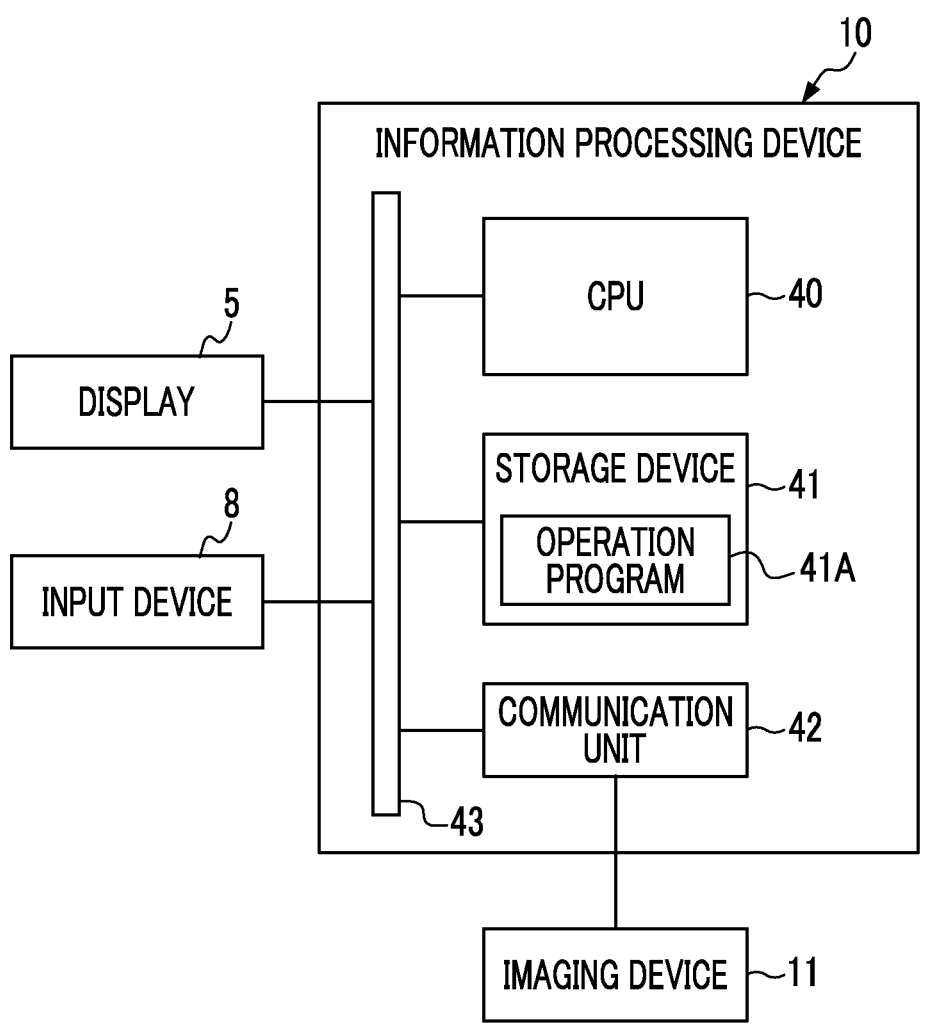
FIG. 9 is a block diagram showing an example of a hardware configuration of an information processing device.

FIG. 9 shows an example of a hardware configuration of the information processing device 10. As shown in FIG. 9, the information processing device 10 comprises a central processing unit (CPU) 40, a storage device 41, and a communication unit 42, which are interconnected via a bus line 43. Further, the display 5 and the input device 8 are connected to the bus line 43.

The CPU 40 is a calculation device that reads out an operation program 41A and various types of data (not shown) stored in the storage device 41 and executes processing to realize various functions. The CPU 40 is an example of a "processor" according to the technique of the present disclosure.

The storage device 41 includes, for example, a random access memory (RAM), a read only memory (ROM), or a storage device. The RAM is, for example, a volatile memory used as a work area or the like. The ROM is, for example, a non-volatile memory such as a flash memory that holds the operation program 41A and various types of data. The storage device is, for example, a hard disk drive (HDD) or a solid state drive (SSD). The storage stores an operating system (OS), an application program, image data, various types of data, and the like.

The communication unit 42 is a network interface that controls transmission of various types of information via a network such as a local area network (LAN) or a wide area network (WAN). The information processing device 10 is connected to the imaging device 11 via the communication unit 42. The display 5 displays various screens. The information processing device 10 receives an input of an operation instruction from the input device 8 through various screens.

Figure 10:
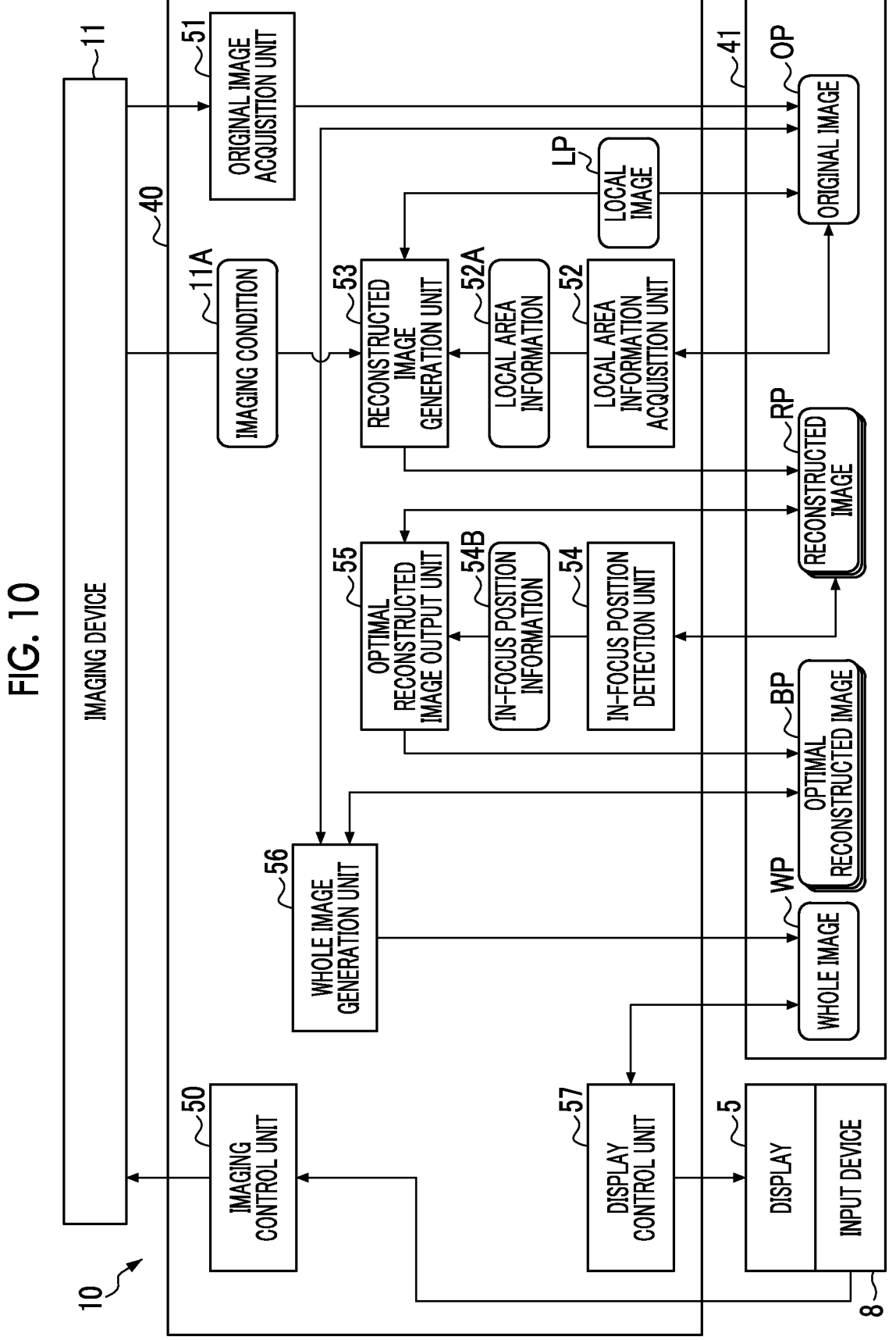
FIG. 10 is a diagram showing an example of a functional configuration of the information processing device.

FIG. 10 shows an example of a functional configuration of the information processing device 10. A function of the information processing device 10 is realized by the CPU 40 executing processing based on the operation program 41A. As shown in FIG. 10, the CPU 40 is configured of an imaging control unit 50, an original image acquisition unit 51, a local area information acquisition unit 52, a reconstructed image generation unit 53, an in-focus position detection unit 54, an optimal reconstructed image output unit 55, a whole image generation unit 56, and a display control unit 57.

The imaging control unit 50 controls an operation of the imaging device 11. Specifically, the imaging control unit 50 controls an operation of generating the irradiation light 23 by the light source 20 and an imaging operation of the imaging sensor 22. Hereinafter, the operation of generating the irradiation light 23 by the light source 20 and the imaging operation of the imaging sensor 22 are collectively referred to as an imaging operation of the imaging device 11. The imaging control unit 50 causes the imaging device 11 to execute the imaging operation based on an operation signal input from the input device 8.

The original image acquisition unit 51 acquires the original image OP (refer to FIG. 8) output as a result obtained by imaging the culture vessel 13 by the imaging device 11. The original image acquisition unit 51 stores the acquired original image OP in the storage device 41.

Figure 11:
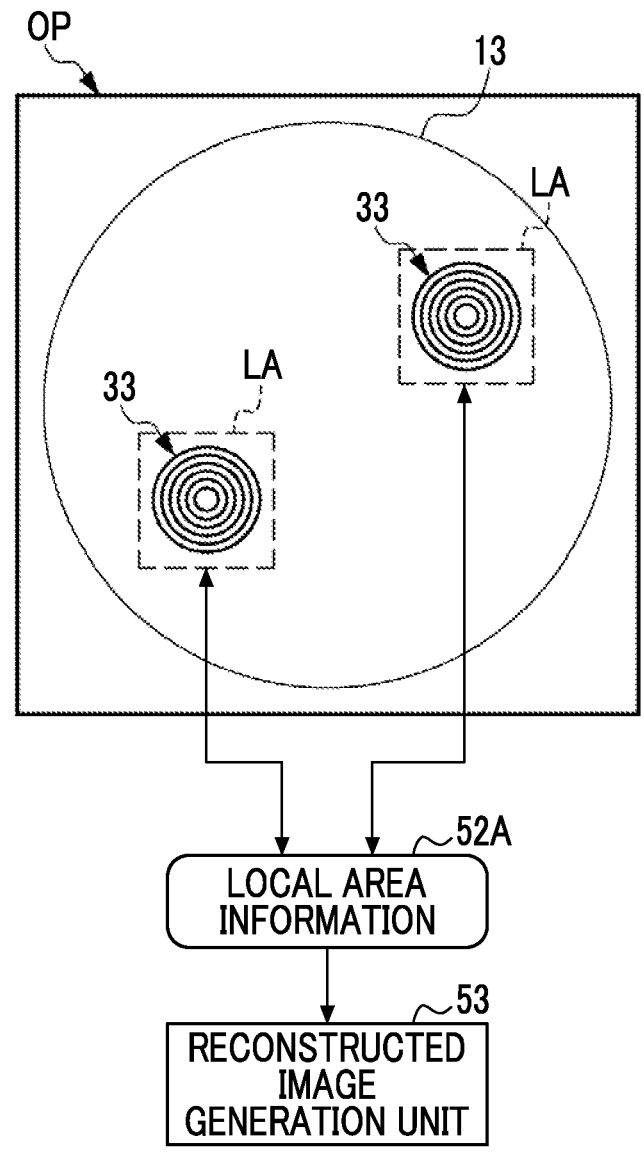
FIG. 11 is a diagram for describing local area information acquisition processing.

The local area information acquisition unit 52 acquires local area information 52A representing the local area including the area including the interference fringe image 33, based on the original image OP stored in the storage device 41. For example, as shown in FIG. 11, the local area information acquisition unit 52 performs image analysis on the original image OP to detect a rectangular local area LA including the interference fringe image 33 for each interference fringe image 33. The local area information acquisition unit 52 generates the local area information 52A representing a position and size of the detected local area LA. The local area information acquisition unit 52 inputs the acquired local area information 52A to the reconstructed image generation unit 53.

The local area information acquisition unit 52 is not limited to the image analysis and may detect the local area LA by image recognition processing using a method such as machine learning.

Figure 12:
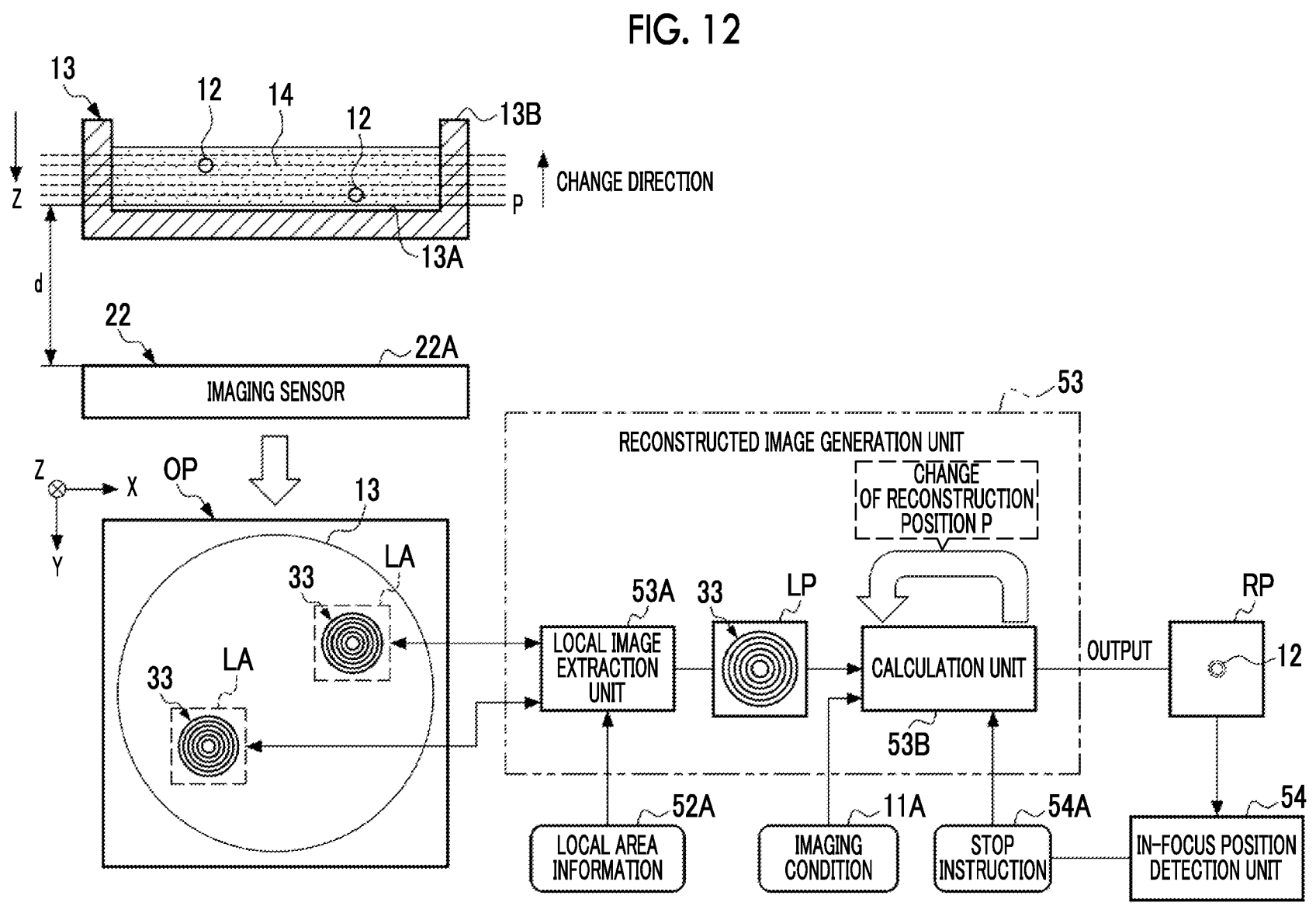

The reconstructed image generation unit 53 generates a reconstructed image RP while changing a reconstruction position in the local area LA of the original image OP based on the local area information 52A. For example, as shown in FIG. 12, the reconstructed image generation unit 53 has a local image extraction unit 53A and a calculation unit 53B. The local image extraction unit 53A cuts out a portion corresponding to the local area LA from the original image OP stored in the storage device 41 to extract a local image LP and inputs the extracted local image LP to the calculation unit 53B. In a case where a plurality of local areas LA are present in the original image OP, the local image extraction unit 53A extracts the local image LP for each local area LA and inputs the local image LP to the calculation unit 53B.

The calculation unit 53B performs a calculation based on the local image LP input from the local image extraction unit 53A to generate the reconstructed image RP. The calculation unit 53B generates the reconstructed image RP each time a reconstruction position P is changed while changing the reconstruction position P by a constant value. The reconstruction position P is a position (so-called depth position) represented by a distance d from the imaging surface 22A of the imaging sensor 22 in a direction of the light source 20.

The calculation unit 53B performs reconstruction processing based on, for example, Fresnel conversion equations represented by the following equations (1) to (3).

$$\Gamma(m,n) = \frac{i}{\lambda d}\exp\left(-i\frac{2\pi}{\lambda}d\right)\exp\left[-i\pi\lambda d\left(\frac{m^2}{N_x^2\Delta x^2} + \frac{n^2}{N_y^2\Delta y^2}\right)\right] \times \tag{1}$$

-continued $$\sum_{x=0}^{N_x-1}\sum_{y=0}^{N_y-1} I(x,y)\exp\left[-l\frac{\pi}{\lambda d}(x^2\Delta x^2 + y^2\Delta y^2)\right]\exp\left[i2\pi\left(\frac{xm}{N_x^2} + \frac{yn}{N_y^2}\right)\right]$$

$$A_0(m,n) = |\Gamma(m,n)|^2 \tag{2}$$

$$\varphi_0(m,n) = \arctan\frac{\mathrm{Im}[\Gamma(m,n)]}{\mathrm{Re}[\Gamma(m,n)]} \tag{3}$$

Here, I(x,y) represents the local image LP. X represents coordinates of the pixel 22B (refer to FIG. 3) of the imaging sensor 22 in the X direction. Y represents coordinates of the pixel 22B in the Y direction. $\Delta x$ is the first arrangement pitch, and $\Delta y$ is the second arrangement pitch (refer to FIG. 3). $\Lambda$ is a wavelength of the irradiation light 23.

As shown in equation (1), $\Gamma(m,n)$ is a complex amplitude image obtained by performing the Fresnel conversion on the local image LP. Here, m=1, 2, 3, . . . , and Nx−1, and n=1, 2, 3, . . . , and Ny−1. Nx represents the number of arrangements of the pixels 22B in the X direction in the local area LA from which the local image LP is extracted. Ny represents the number of arrangements of the pixels 22B in the Y direction in the local area LA from which the local image LP is extracted.

As shown in equation (2), $A_0(m,n)$ is an intensity distribution image representing an intensity component of the complex amplitude image $\Gamma(m,n)$. As shown in equation (3), $\varphi_0(m,n)$ is a phase distribution image representing a phase component of the complex amplitude image $\Gamma(m,n)$.

The calculation unit 53B obtains the complex amplitude image $\Gamma(m,n)$ by applying the local image LP to equation (1) and obtains the intensity distribution image $A_0(m,n)$ or the phase distribution image $\varphi_0(m,n)$ by applying the obtained complex amplitude image $\Gamma(m,n)$ to equation (2) or equation (3). The calculation unit 53B obtains any one of the intensity distribution image $A_0(m,n)$ or the phase distribution image $\varphi_0(m,n)$ and outputs the obtained image as the reconstructed image RP.

In the present embodiment, the calculation unit 53B outputs the phase distribution image $\varphi_0(m,n)$ as the reconstructed image RP. The phase distribution image $\varphi_0(m,n)$ is an image representing a refractive index distribution of the object to be observed. The cell 12 which is the object to be observed in the present embodiment is translucent, and thus most of the irradiation light 23 is not absorbed by the cell 12, but is transmitted or diffracted. Therefore, an image hardly appears in an intensity distribution. Therefore, in the present embodiment, it is preferable to use the phase distribution image $\varphi_0(m,n)$ as the reconstructed image RP.

The wavelength $\lambda$ of the irradiation light 23 is included in, for example, an imaging condition 11A supplied from the imaging device 11. The calculation unit 53B performs the calculation of equation (1) using a value of the wavelength $\lambda$ included in the imaging condition 11A. Further, the calculation unit 53B obtains the complex amplitude image $\Gamma(m,n)$ by performing the calculation of equation (1) while changing the distance d corresponding to the reconstruction position P by a constant value, and applies the obtained complex amplitude image $\Gamma(m,n)$ to equation (2) or equation (3).

Figures 13, 14:
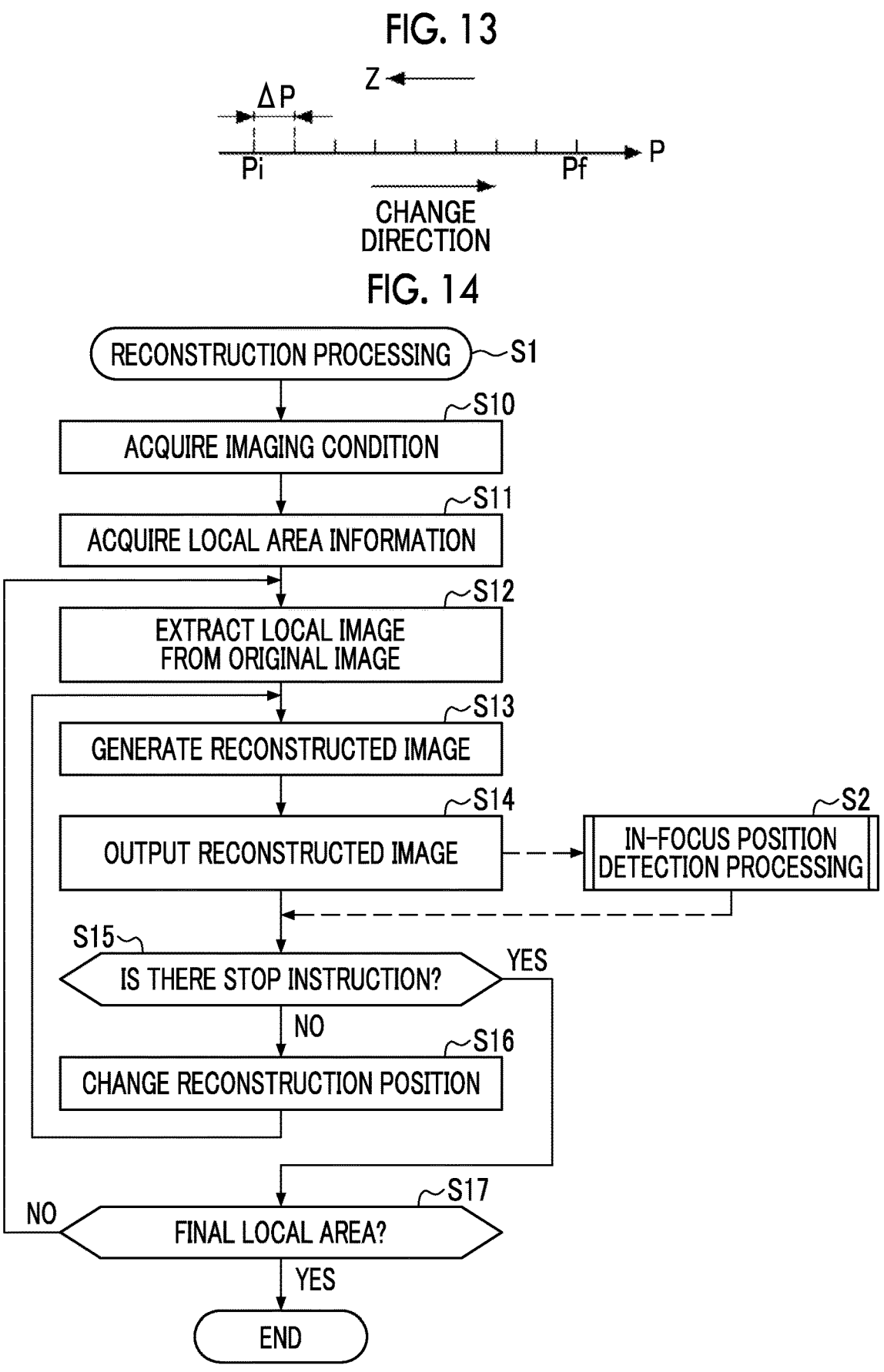
FIG. 13 is a diagram for describing a method of changing a reconstruction position.
FIG. 14 is a flowchart showing an example of a flow of the reconstruction processing.

For example, as shown in FIG. 13, the reconstructed image generation unit 53 starts the change of the reconstruction position P from an initial position Pi and repeats the generation of the reconstructed image RP while changing the reconstruction position P by a constant value $\Delta P$ from the initial position Pi toward a final position Pf. It is preferable that the initial position Pi and the final position Pf are set, in the Z direction, to correspond to a lower limit and an upper limit of a range in which the cell 12, which is the object to be observed, is present. For example, the initial position Pi is set to be in the vicinity of the bottom surface 13A of the culture vessel 13. Further, the final position Pf is set to be in the vicinity of an upper end surface 13B (refer to FIG. 12) of the culture vessel 13. The change of the reconstruction position P corresponds to the change of the distance d in equation (1).

Each time the reconstructed image RP is generated, the reconstructed image generation unit 53 outputs the reconstructed image RP to store the output image in the storage device 41. In a case where a stop instruction 54A is received from the in-focus position detection unit 54 described below, the reconstructed image generation unit 53 stops the change of the reconstruction position P.

The reconstructed image generation unit 53 performs the reconstruction processing on each of the local images LP input from the local image extraction unit 53A. In the reconstructed image generation unit 53, the reconstruction processing method is not limited to the method using the Fresnel conversion equation and the reconstruction processing may be performed by a Fourier iterative phase recovery method or the like.

FIG. 14 shows an example of a flow of reconstruction processing S1 by the reconstructed image generation unit 53. First, the reconstructed image generation unit 53 acquires the imaging condition 11A including the value of the wavelength $\lambda$ from the imaging device 11 (step S10). Next, the reconstructed image generation unit 53 acquires the local area information 52A from the local area information acquisition unit 52 (step S11). Here, the local area information 52A is assumed to include the plurality of local areas LA as shown in FIG. 11.

As shown in FIG. 12, in the reconstructed image generation unit 53, the local image extraction unit 53A extracts the local image LP from one of the plurality of local areas LA included in the local area information 52A based on the original image OP (step S12).

Next, in the reconstructed image generation unit 53, the calculation unit 53B reconstructs the local image LP extracted by the local image extraction unit 53A with the reconstruction position P as the initial position P to generate the reconstructed image RP (step S13). As described above, in the present embodiment, the reconstructed image RP is the phase distribution image $\varphi_o(m,n)$. The value of the wavelength $\lambda$ included in the imaging condition 11A acquired in step S10 is used in generating the reconstructed image RP.

The reconstructed image generation unit 53 outputs the reconstructed image RP generated by the calculation unit 53B (step S14). The reconstructed image RP output from the reconstructed image generation unit 53 is stored in the storage device 41, and the in-focus position detection unit 54 performs in-focus position detection processing described below. In a case where the in-focus position is detected based on the reconstructed image RP input from the reconstructed image generation unit 53, the in-focus position detection unit 54 transmits the stop instruction 54A (refer to FIG. 12) to the reconstructed image generation unit 53.

The reconstructed image generation unit 53 determines whether or not the stop instruction 54A is received from the in-focus position detection unit 54 (step S15). In a case where determination is made that the stop instruction 54A has not been received (step S15: NO), the reconstructed image generation unit 53 changes the reconstruction position P by the constant value $\Delta P$ (step S16) and returns the processing to step S13. In step S13, the calculation unit 53B reconstructs the local image LP using the changed reconstruction position P, and thus a new reconstructed image RP is generated. The processing from step S13 to step S16 is repeated until the determination is affirmed in step S15.

In a case where determination is made that the stop instruction 54A has been received (step S15: YES), the reconstructed image generation unit 53 determines whether or not the reconstructed local image LP corresponds to a final local area LA among the plurality of local areas LA included in the local area information 52A (step S16). That is, in step S16, the reconstructed image generation unit 53 determines whether or not the reconstruction has been performed for all of the plurality of local areas LA included in the local area information 52A.

In a case where determination is made that the reconstructed local image LP is not the final local area LA (step S17: NO), the reconstructed image generation unit 53 returns the processing to step S12. In step S12, the local image LP is extracted from the local area LA that has not been reconstructed, among the plurality of local areas LA included in the local area information 52A. Thereafter, in step S13, the same reconstruction as described above is performed.

The processing from step S12 to step S17 is repeated until the determination is affirmed in step S17. In a case where determination is made that the reconstructed local image LP is the final local area LA (step S17: YES), the reconstructed image generation unit 53 ends the series of pieces of reconstruction processing S1.

Returning to FIG. 10, the in-focus position detection unit 54 obtains sharpness of each of the reconstructed images RP that are output from the reconstructed image generation unit 53 and stored in the storage device 41, and searches for the reconstruction position P (that is, in-focus position) where the sharpness is maximized. The in-focus position detection unit 54 inputs in-focus position information 54B representing the detected in-focus position to the optimal reconstructed image output unit 55.

The in-focus position detection unit 54 calculates, for example, a contrast value of the reconstructed image RP as the sharpness. The in-focus position detection unit 54 may use a value obtained by evaluating the spread of the image of the cell 12 in the reconstructed image RP with a cross-sectional profile or the like as the sharpness. Further, the in-focus position detection unit 54 may perform frequency analysis such as Fourier analysis to obtain the sharpness.

Figure 15:
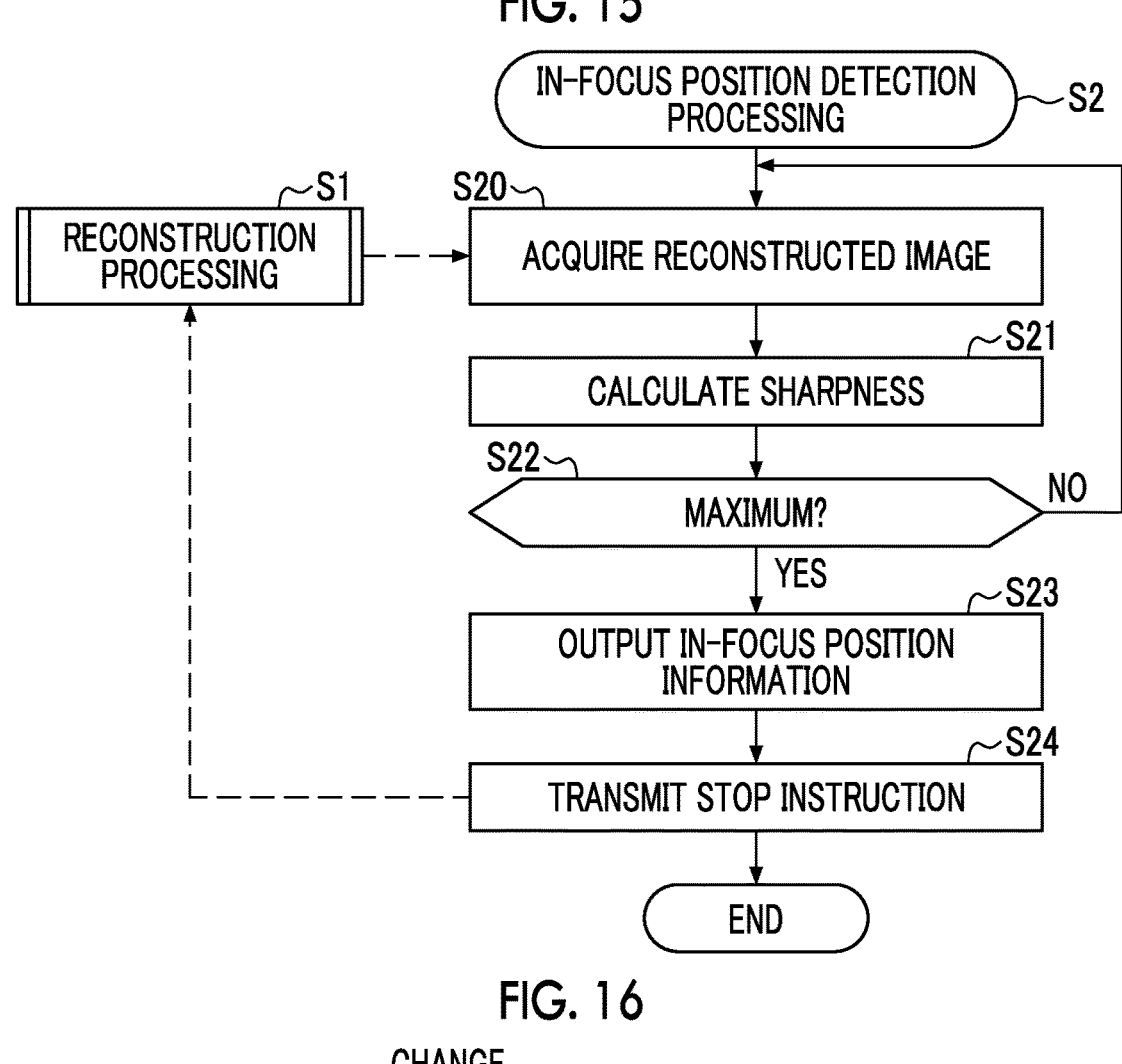
FIG. 15 is a flowchart showing an example of a flow of in-focus position detection processing.

FIG. 15 shows an example of a flow of in-focus position detection processing S2 by the in-focus position detection unit 54. First, the in-focus position detection unit 54 acquires one reconstructed image RP that is output from the reconstructed image generation unit 53 and stored in the storage device 41 (step S20). The in-focus position detection unit 54 calculates the sharpness of the acquired reconstructed image RP (step S21).

Next, the in-focus position detection unit 54 determines whether or not the calculated sharpness reaches the maximum (step S22). In a case where determination is made that the sharpness has not reached the maximum (step S22: NO), the in-focus position detection unit 54 returns the processing to step S20. In step S20, the in-focus position detection unit 54 again acquires one reconstructed image RP that is output from the reconstructed image generation unit 53 and stored in the storage device 41. The processing from step S20 to step S22 is repeated until the determination is affirmed in step S22.

In a case where determination is made that the calculated sharpness has reached the maximum (YES in step S22), the in-focus position detection unit 54 detects the reconstruction position P where the sharpness is maximized as the in-focus position and outputs the in-focus position information 54B (step S23). Then, the in-focus position detection unit 54 transmits the above stop instruction 54A to the reconstructed image generation unit 53 (step S24). This ends the series of pieces of in-focus position detection processing S2.

Figure 16:
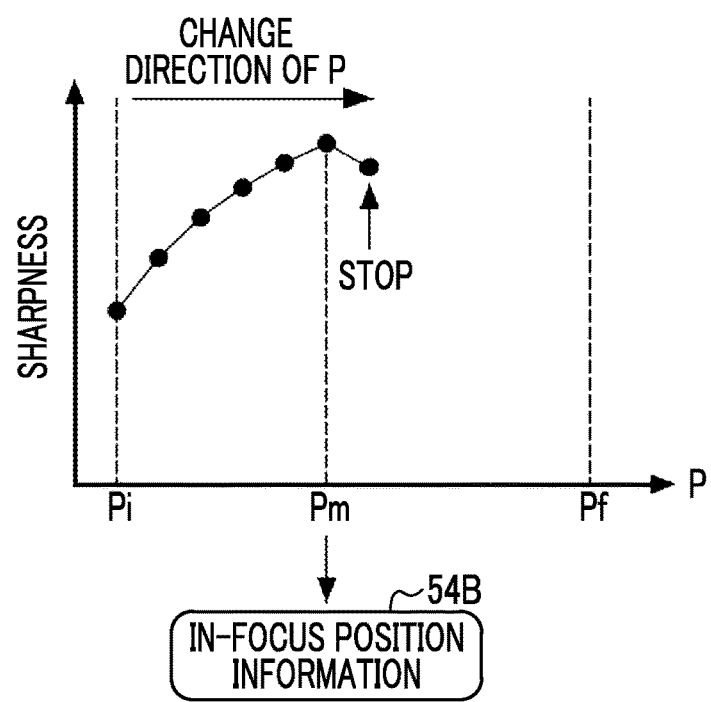
FIG. 16 is a graph showing an example of processing of searching for an in-focus position.

FIG. 16 shows an example of processing of searching for the in-focus position. As shown in FIG. 16, the in-focus position detection unit 54 performs, for example, peak determination of the sharpness by a so-called mountain climbing method. Each time the sharpness is calculated, the in-focus position detection unit 54 plots the calculated sharpness in association with the reconstruction position P. The sharpness increases as the reconstruction position P approaches an in-focus position Pm and decreases after the reconstruction position P passes the in-focus position Pm. In a case where detection is made that the sharpness has changed from the increase to the decrease, the in-focus position detection unit 54 detects a previous reconstruction position P as the in-focus position Pm. The in-focus position Pm corresponds to a depth position of the cell 12, which is the object to be observed.

Further, in a case where detection is made that the sharpness has changed from the increase to the decrease, the in-focus position detection unit 54 transmits the above stop instruction 54A to the reconstructed image generation unit 53.

Returning to FIG. 10, the optimal reconstructed image output unit 55 acquires the reconstructed image RP at the in-focus position from the plurality of reconstructed images RP stored in the storage device 41 based on the in-focus position information 54B input from the in-focus position detection unit 54, and outputs the acquired image as an optimal reconstructed image BP. The optimal reconstructed image BP output from the optimal reconstructed image output unit 55 is stored in the storage device 41.

Figure 17:
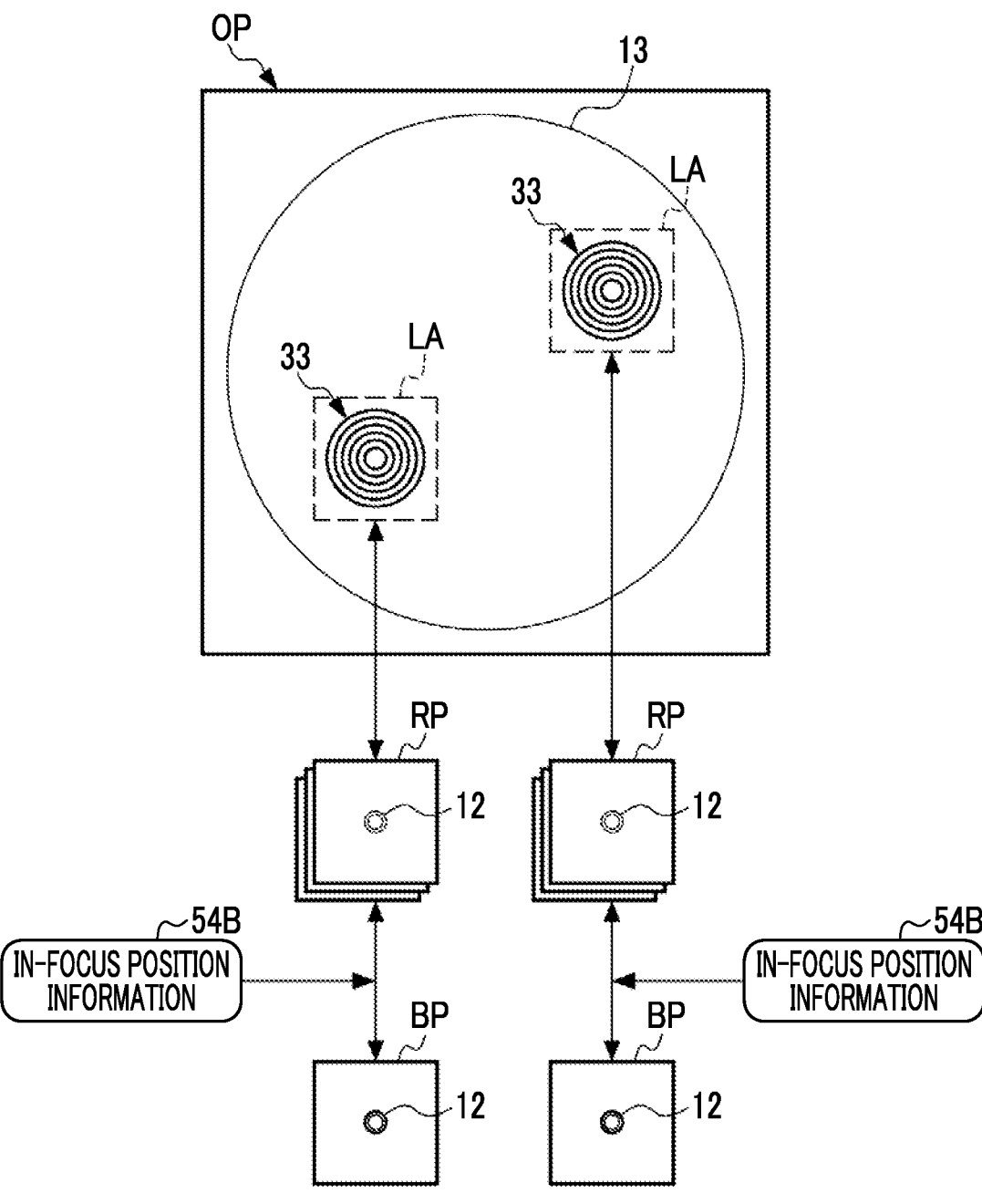
FIG. 17 is a diagram showing an example of optimal reconstructed image output processing.

FIG. 17 shows an example of optimal reconstructed image output processing by the optimal reconstructed image output unit 55. As shown in FIG. 17, the optimal reconstructed image output unit 55 acquires the reconstructed image RP corresponding to the in-focus position as the optimal reconstructed image BP from the plurality of reconstructed images RP based on the in-focus position information 54B for each of the plurality of local areas LA in one original image OP, and outputs the acquired image. Therefore, the optimal reconstructed image BP corresponding to the depth position of the cell 12 in the local area LA is obtained for each local area LA.

Returning to FIG. 10, the whole image generation unit 56 disposes the optimal reconstructed image BP in a reference image for each local area LA to generate a whole image WP. In the present embodiment, the whole image generation unit 56 uses the original image OP as the reference image. The whole image generation unit 56 stores the generated whole image WP in the storage device 41.

Figure 18:
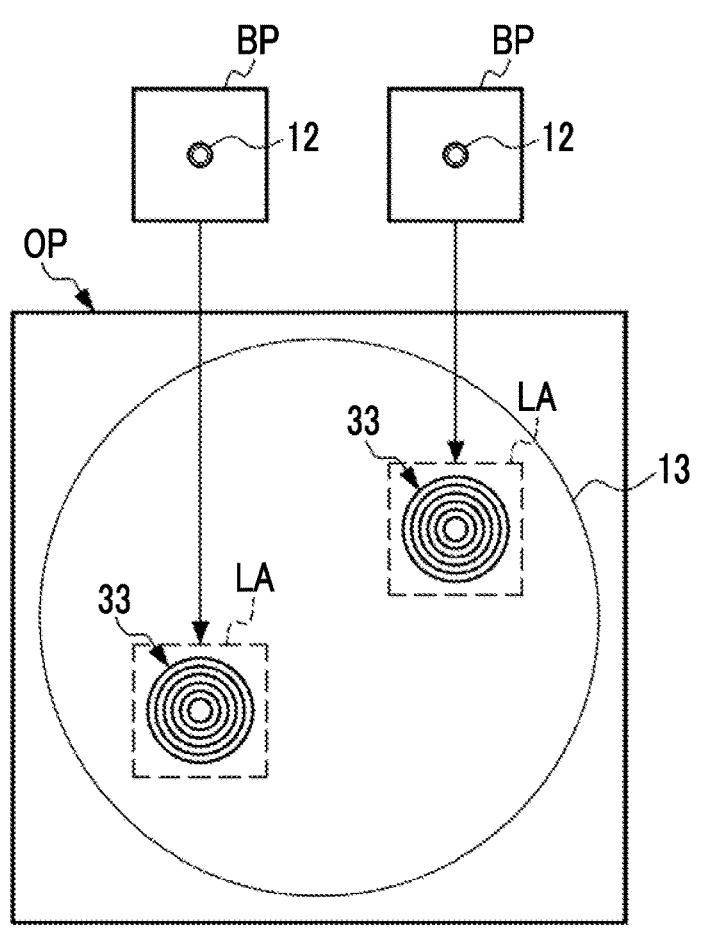
FIG. 18 is a diagram showing an example of whole image generation processing.
Figure 18:
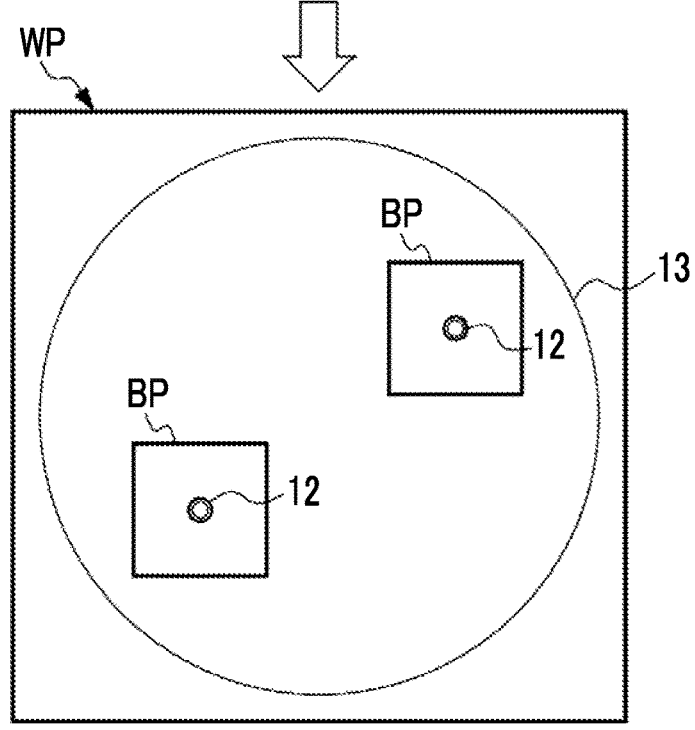

FIG. 18 shows an example of whole image generation processing by the whole image generation unit 56. As shown in FIG. 18, the whole image generation unit 56 acquires the optimal reconstructed image BP and the original image OP from the storage device 41 and disposes the optimal reconstructed image BP in the corresponding local area LA in the original image OP (that is, replaces the image in the local area LA with the optimal reconstructed image BP) to generate the whole image WP.

Returning to FIG. 10, the display control unit 57 displays the whole image WP stored in the storage device 41 on the display 5.

Figure 19:
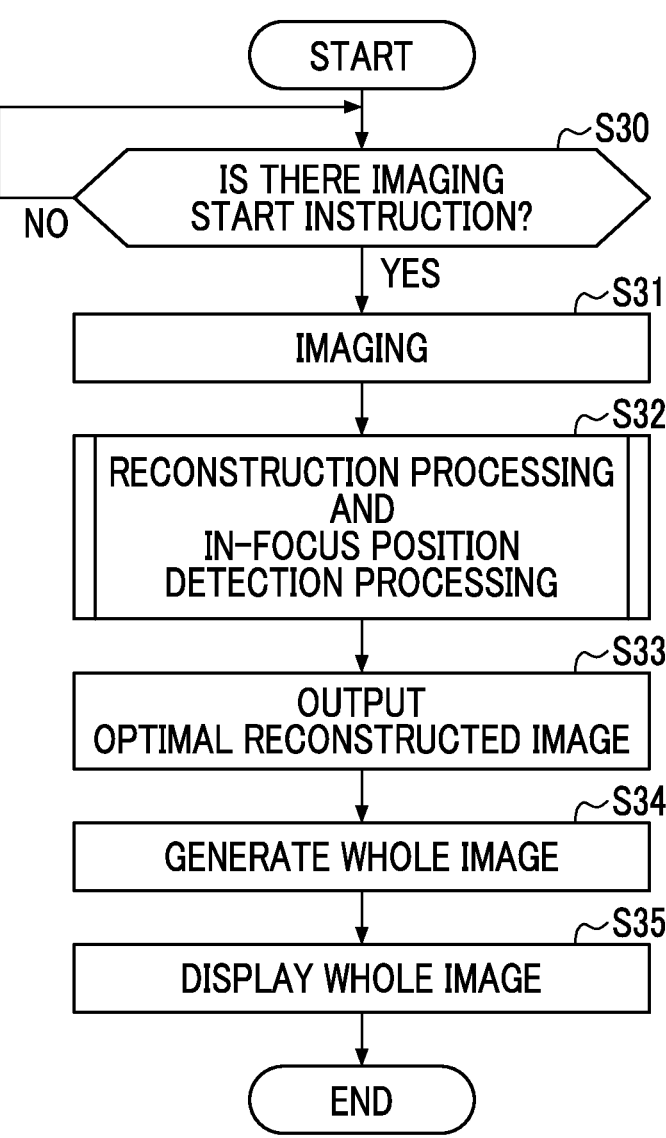
FIG. 19 is a flowchart showing an example of an overall operation of the digital holography system.

Next, an overall operation of the digital holography system 2 configured as described above will be described with reference to a flowchart shown in FIG. 19. First, the user places the culture vessel 13 on the stage 21 and then operates the input device 8 to issue an imaging start instruction. The imaging control unit 50 in the information processing device 10 determines whether or not the imaging start instruction has been issued (step S30). In a case where determination is made that the imaging start instruction has been issued, the imaging control unit 50 causes the imaging device 11 to perform the imaging operation (step S31). The imaging device 11 inputs the original image OP obtained by the imaging to the information processing device 10.

In the information processing device 10, the reconstructed image generation unit 53 performs the reconstruction processing S1 and the in-focus position detection unit 54 performs the in-focus position detection processing, based on the local area information 52A acquired by the local area information acquisition unit 52 (step S32). In step S32, the reconstruction processing S1 shown in FIG. 14 and the in-focus position detection processing S2 shown in FIG. 15 are included. As a result of the reconstruction processing S1 and the in-focus position detection processing S2, the in-focus position is obtained for each local area LA. Then, the optimal reconstructed image output unit 55 outputs the reconstructed image RP corresponding to the in-focus position for each local area LA as the optimal reconstructed image BP (step S33).

Thereafter, the whole image generation unit 56 generates the whole image WP using the original image OP and the optimal reconstructed image BP (step S34). The whole image WP generated by the whole image generation unit 56 is displayed on the display 5 by the display control unit 57.

As described above, in the technique of the present disclosure, since the reconstruction processing and the in-focus position detection processing are performed on the local area LA including the interference fringe image 33 in the original image OP, an efficiency of searching for the in-focus position is improved.

Hereinafter, various modification examples of the above embodiment will be described.

First Modification Example

In the above embodiment, the local area information acquisition unit 52 performs the image analysis, the image recognition processing, or the like on the original image OP to acquire the local area information 52A. In a first modification example, the local area information acquisition unit 52 acquires the local area information 52A based on a setting operation of the user using the input device 8.

Figure 20:
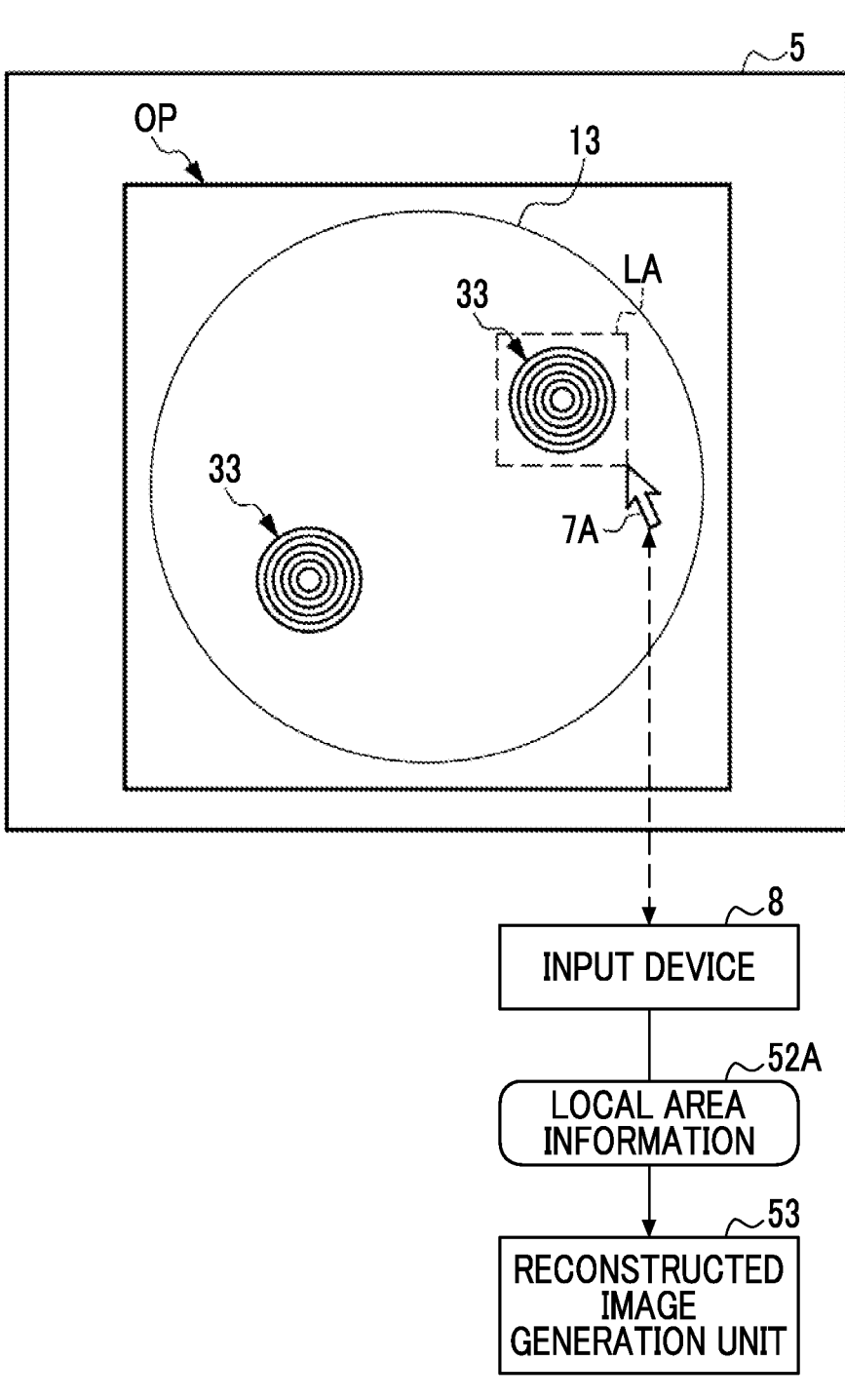
FIG. 20 is a diagram showing local area information acquisition processing according to a first modification example.

FIG. 20 shows local area information acquisition processing according to the first modification example. As shown in FIG. 20, in the local area information acquisition processing according to the present modification example, the original image OP is displayed on the display 5. The display 5 displays a cursor 7A that moves in response to an operation of the mouse 7 (refer to FIG. 1) included in the input device 8. The user can set the local area LA to include the interference fringe image 33 in the original image OP by operating the mouse 7. The user sets the local area LA for each of the interference fringe images 33 in the original image OP.

In the present modification example, the local area information acquisition unit 52 acquires information representing the local area LA set by using the input device 8 as the local area information 52A and inputs the acquired information to the reconstructed image generation unit 53. The processing of the reconstructed image generation unit 53 and the like are the same as those of the above embodiment.

Second Modification Example

In the above embodiment, the reconstructed image generation unit 53 generates the reconstructed image RP while changing the reconstruction position P from the initial position Pi, stops the change of the reconstruction position P at a point in time at which the in-focus position detection unit 54 detects the in-focus position, and then ends the reconstruction processing. On the contrary, in a second modification example, the reconstructed image generation unit 53 does not stop the change of the reconstruction position P in a case where the in-focus position detection unit 54 detects the in-focus position, and performs the reconstruction processing until the reconstruction position P is reached from the initial position Pi to the final position Pf. Therefore, in the present modification example, in the case where the in-focus position is detected, the in-focus position detection unit 54 does not perform the transmission of the above stop instruction 54A.

Figure 21:
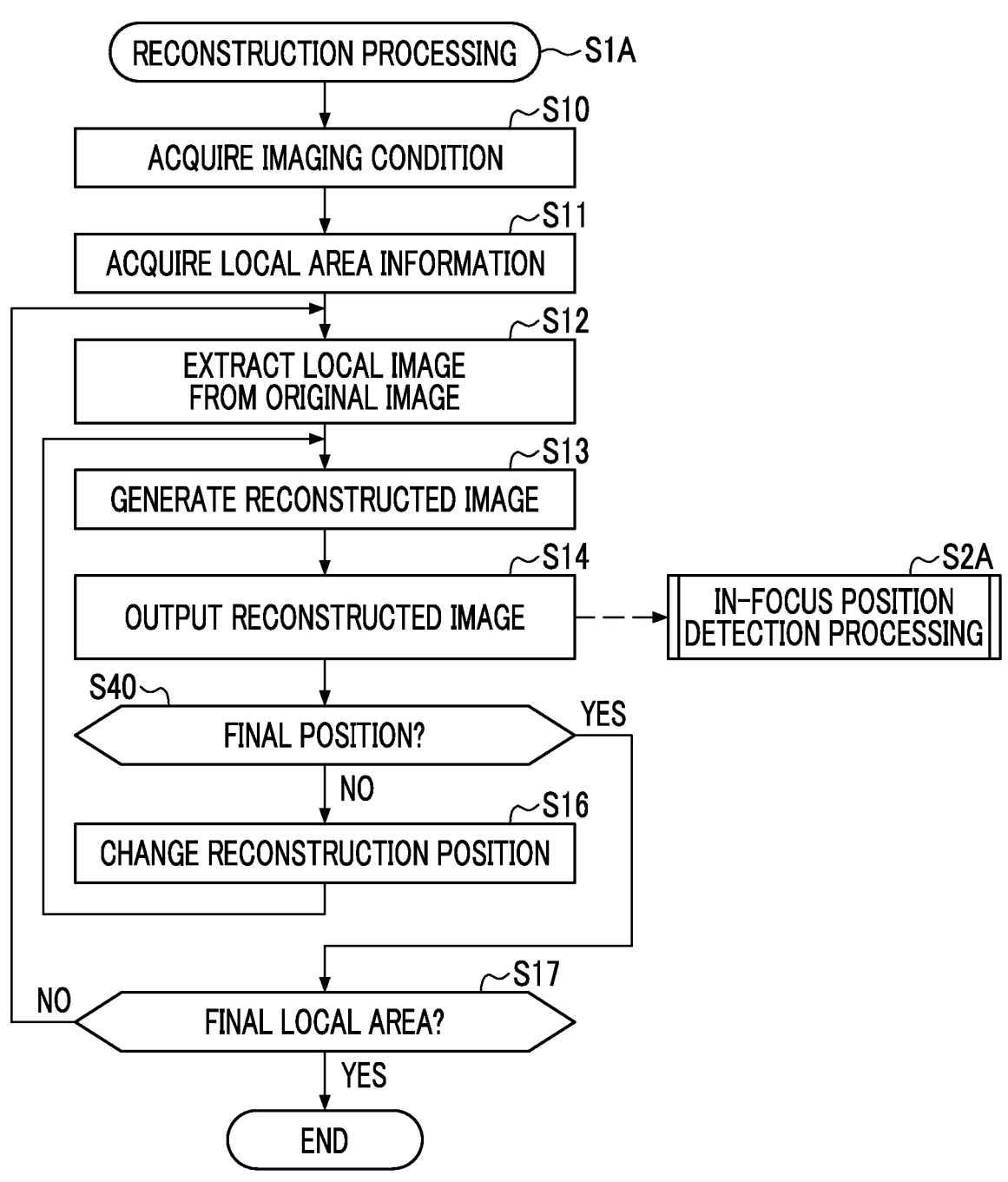
FIG. 21 is a flowchart showing reconstruction processing according to a second modification example.

FIG. 21 shows reconstruction processing S1A according to the second modification example. The reconstruction processing S1A according to the present modification example is different from the reconstruction processing S1 shown in FIG. 14 only in that step S15 of determining the presence or absence of the stop instruction is changed to step S40 of determining whether or not the reconstruction position P is reached the final position Pf. In FIG. 21, the same reference numerals are assigned to the steps representing the same processing contents as those in FIG. 14.

In the present modification example, the reconstructed image generation unit 53 outputs the reconstructed image RP in step S14 and then determines whether or not the reconstruction position P is the final position Pf (step S40). In a case where determination is made that the reconstruction position P is not the final position Pf (step S40: NO), the reconstructed image generation unit 53 shifts the processing to step S16. On the other hand, in a case where determination is made that the reconstruction position P is the final position Pf (step S40: YES), the reconstructed image generation unit 53 shifts the processing to step S17.

Figure 22:
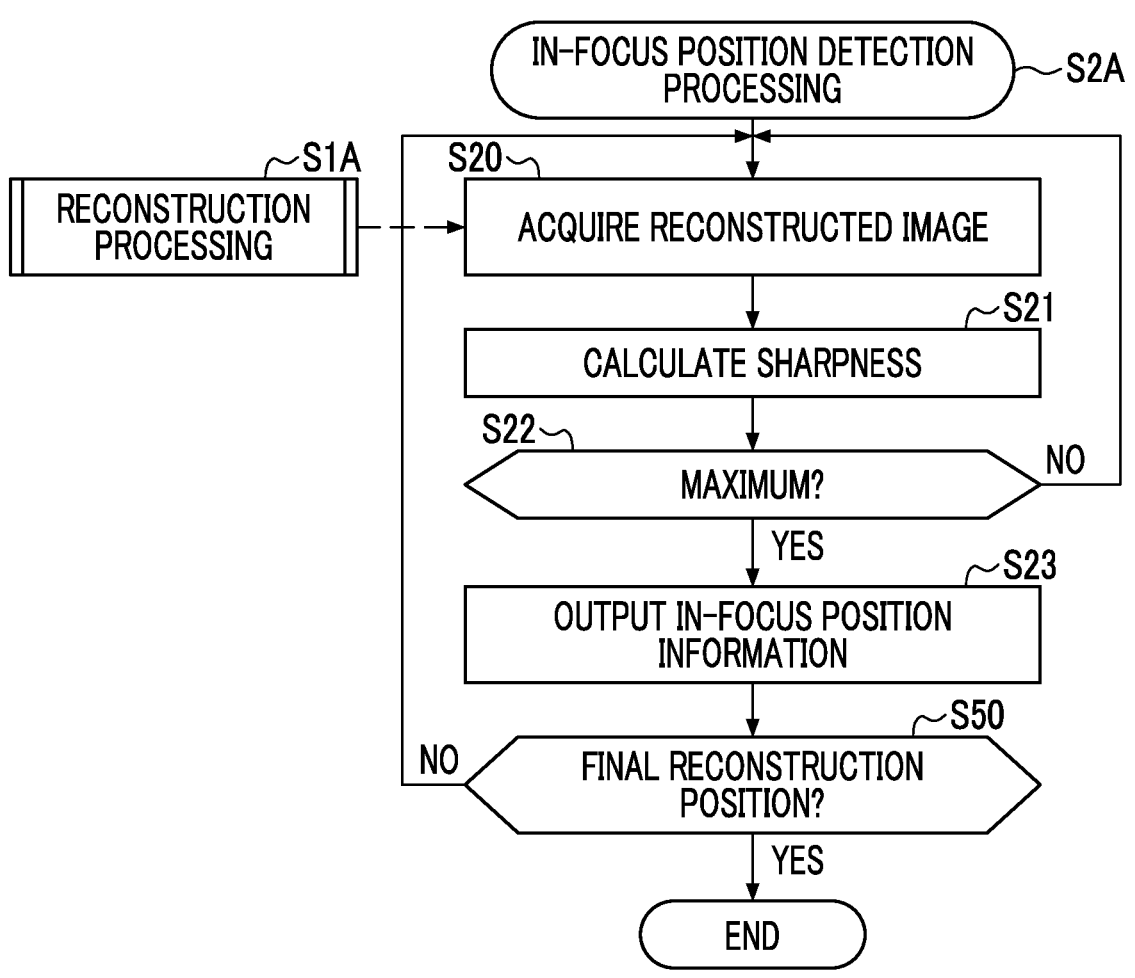
FIG. 22 is a flowchart showing in-focus position detection processing according to the second modification example.

FIG. 22 shows in-focus position detection processing S2A according to the second modification example. The in-focus position detection processing S2A according to the present modification example is different from the in-focus position detection processing S2 shown in FIG. 15 only in that step S24 of transmitting the stop instruction 54A is changed to step S50 of determining whether or not the reconstruction position P is reached the final position Pf. In FIG. 22, the same reference numerals are assigned to the steps representing the same processing contents as those in FIG. 15.

In the present modification example, the in-focus position detection unit 54 outputs the in-focus position information 54B in step S23 and then determines whether or not the reconstruction position P is the final position Pf (step S50). In a case where determination is made that the reconstruction position P is not the final position Pf (step S50: NO), the in-focus position detection unit 54 shifts the processing to step S20. On the other hand, in a case where determination is made that the reconstruction position P is the final position Pf (step S50: YES), the in-focus position detection unit 54 ends the processing.

The in-focus position detection unit 54 may use the determination result by the reconstructed image generation unit 53 without performing the determination regarding the final position Pf by itself.

Figure 23:
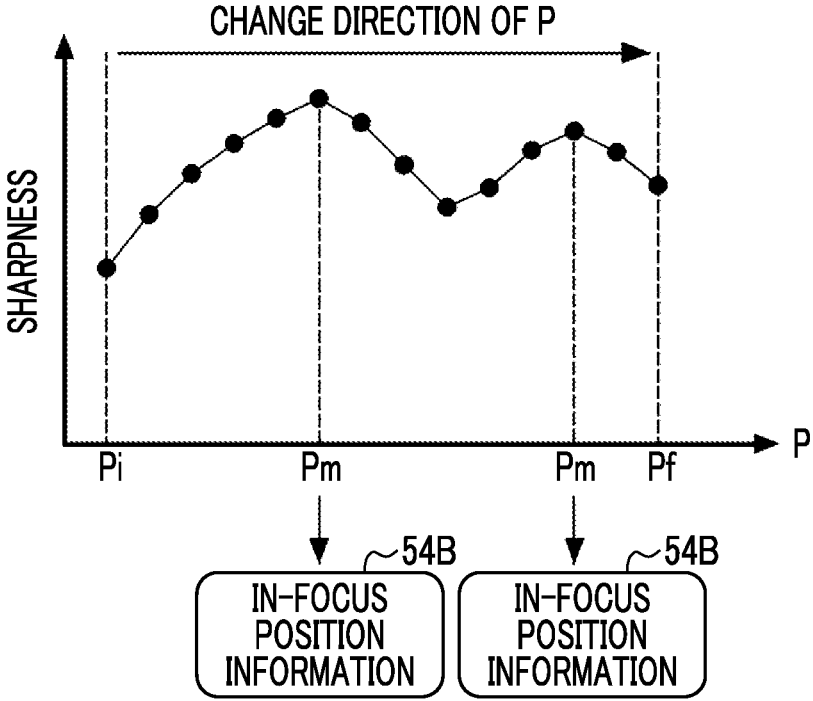
FIG. 23 is a graph showing processing of searching for an in-focus position according to the second modification example.

FIG. 23 shows processing of searching for the in-focus position according to the second modification example. In the present modification example, the reconstruction position P is changed from the initial position Pi to the final position Pf regardless of the presence or absence of the detection of the in-focus position. Therefore, a plurality of in-focus positions Pm, which are the reconstruction positions P where the sharpness is maximized, may be detected. FIG. 23 shows an example in which two in-focus positions Pm are detected. For example, in a case where two cells 12 overlap each other in a depth direction, two in-focus positions Pm are detected (refer to FIG. 24). As described above, in the present modification example, a plurality of in-focus positions Pm may be detected for one local area LA.

In the present modification example, in a case where the plurality of in-focus positions Pm are detected for one local area LA, the optimal reconstructed image output unit 55 outputs a plurality of optimal reconstructed images BP for one local area LA. In this case, the whole image generation unit 56 may generate the whole image WP using, for example, each of the plurality of optimal reconstructed images BP.

Figure 24:
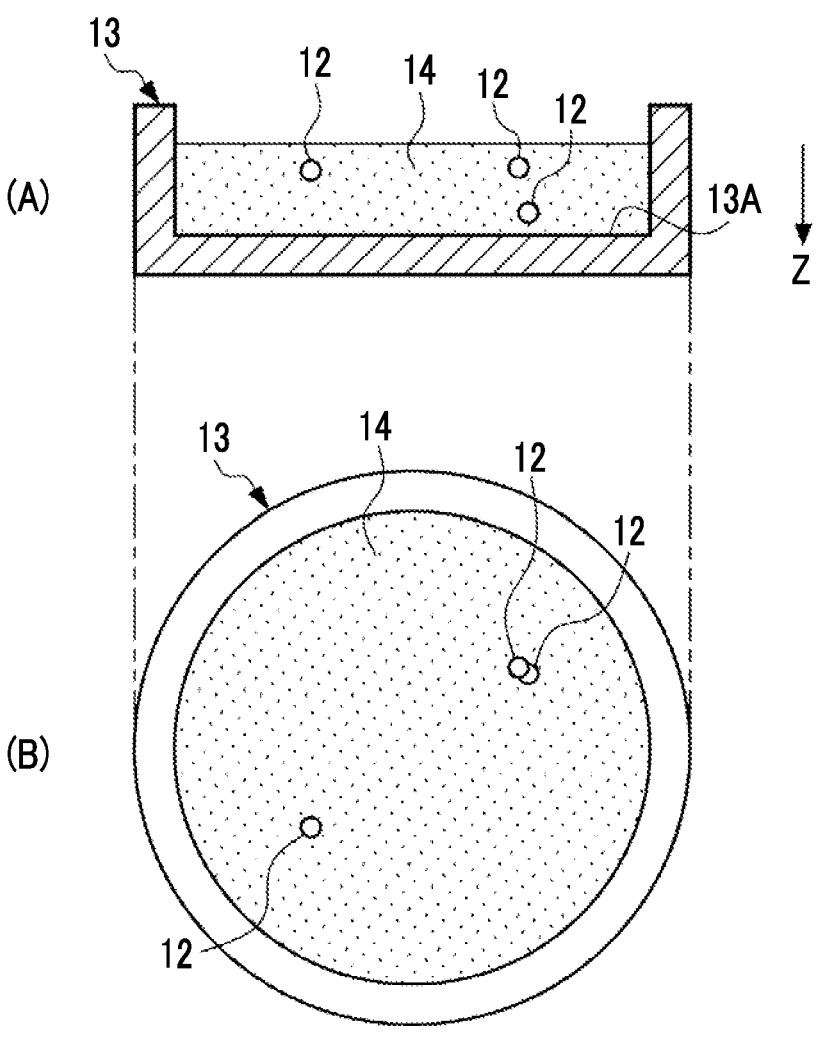
FIG. 24 is a diagram showing an example in which two cells overlap each other in a depth direction in a culture vessel.

FIG. 24 shows an example in which two cells 12 overlap each other in the depth direction (Z direction) in the culture vessel 13. (A) of FIG. 24 is a cross-sectional view of the culture vessel 13 cut along a plane parallel to the Z direction. (B) of FIG. 24 is a plan view of the culture vessel 13 as viewed from the Z direction.

With the reconstruction processing S1A and the in-focus position detection processing S2A according to the second modification example, it is possible to generate the optimal reconstructed image BP corresponding to each cell 12 even in a case where the two cells 12 overlap each other in the depth direction.

The present modification example is not limited to the culture vessel 13 as shown in FIG. 24 and is also effective in a case where an imaging target is a microchannel having a layered structure in which a plurality of microchannels used for cell culture is laminated. In a case where the plurality of microchannels are laminated in the depth direction (Z direction), it is possible to generate the optimal reconstructed image BP corresponding to the cell flowing in each microchannel.

Third Modification Example

In the above embodiment, the local area LA is set to include the interference fringe image 33 in the original image OP. On the contrary, in a third modification example, each divided area formed by dividing the original image OP is set as the local area LA.

Figure 25:
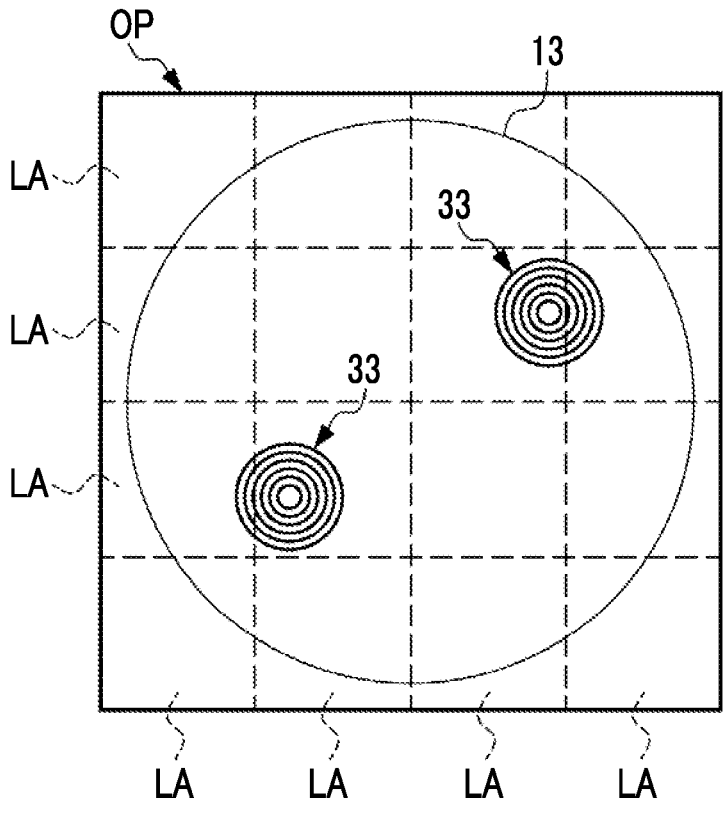
FIG. 25 is a diagram showing a local area according to a third modification example.

FIG. 25 shows a local area LA according to the third modification example. In the present modification example, the reconstruction processing and the in-focus position detection processing similar to those of the above embodiment or the second modification example are performed for each local area LA regardless of whether or not the interference fringe image 33 is included in the local area LA.

A size of the local area LA may be decided according to an assumed size of the object to be observed. For example, the size of the local area LA is smaller as the assumed size of the object to be observed is smaller. Further, in a case where the local area LA is small, the number of local areas LA is large, the reconstruction processing and the in-focus position detection processing take time, and processing load of the CPU 40 and the like is increased. Therefore, the size of the local area LA may be decided according to processing capacity of the CPU 40 and the like.

In the present modification example, the whole image generation unit 56 can generate the whole image WP by replacing all the local areas LA with the optimal reconstructed images BP corresponding to the respective local areas LA without using the reference image such as the original image OP.

The present modification example is particularly effective in a case where a large number of objects to be observed are shown in the original image OP and it is difficult to individually set the local area LA for each object to be observed.

Other Modification Examples

In the above embodiment, the phase distribution image $\varphi_0(m,n)$ obtained by equation (3) is used as the reconstructed image RP, but the reconstructed image RP is not limited thereto. The intensity distribution image $A_0(m,n)$ obtained by equation (2) may be used as the reconstructed image RP. In a case where the object to be observed has a thickness such as a cell population (so-called colony), an image appears in the intensity distribution. Therefore, it is preferable to use the intensity distribution image $A_0(m,n)$ as the reconstructed image RP.

The user may select which of the phase distribution image $\varphi_0(m,n)$ and the intensity distribution image $A_0(m,n)$ is used as the reconstructed image RP, by using the input device 8. Accordingly, the user can select an optimal reconstructed image RP according to the object to be observed.

In the above embodiment, the imaging condition 11A includes the wavelength $\lambda$ of the irradiation light 23, but the imaging condition 11A may include a position of the object to be observed in the Z direction. With the change in the distance between the object to be observed and the imaging sensor 22, it is possible to obtain the same effect as the change of the wavelength $\lambda$.

The digital holography system 2 according to the above embodiment relates to a technique referred to as so-called lens-free imaging in which the imaging device 11 does not comprise an optical lens. The technique of the present disclosure is not limited to the lens-free imaging and can be applied to general digital holography (for example, in a case where reference light is used).

The hardware configuration of the computer configuring the information processing device 10 may be modified in various ways. For example, the information processing device 10 may be configured of a plurality of computers separated as hardware for the purpose of improving processing capacity and reliability.

As described above, the hardware configuration of the computer of the information processing device 10 may be changed as appropriate according to required performance such as processing capacity, safety, and reliability. Further, not only the hardware but also the application program such as the operation programs 41A may be duplicated or stored in a plurality of storage devices in a distributed manner for the purpose of ensuring safety and reliability.

In the above embodiment, for example, as a hardware structure of the processing units executing various types of processing such as the imaging control unit 50, the original image acquisition unit 51, the local area information acquisition unit 52, the reconstructed image generation unit 53, the in-focus position detection unit 54, the optimal reconstructed image output unit 55, the whole image generation unit 56, and the display control unit 57, various processors shown below can be used. The various processors include a programmable logic device (PLD) which is a processor whose circuit configuration is changeable after manufacturing such as a field programmable gate array (FPGA), a dedicated electric circuit which is a processor having a circuit configuration exclusively designed to execute specific processing such as an application specific integrated circuit (ASIC), and the like, in addition to the CPU 40 which is a general-purpose processor that executes software (operation program 41A) to function as various processing units, as described above.

One processing unit may be configured by one of the various processors or a combination of two or more processors of the same type or different types (for example, a combination of a plurality of FPGAs and/or a combination of a CPU and an FPGA). The plurality of processing units may be configured of one processor.

As an example of configuring the plurality of processing units with one processor, first, there is a form in which one processor is configured by a combination of one or more CPUs and software and the processor functions as the plurality of processing units, as represented by computers such as a client and a server. Second, there is a form in which a processor that realizes the functions of the entire system including the plurality of processing units with one integrated circuit (IC) chip is used, as represented by a system on chip (SoC) or the like. As described above, the various processing units are configured using one or more of the various processors as the hardware structure.

Further, more specifically, a circuitry combining circuit elements such as semiconductor elements can be used as the hardware structure of the various processors.

The above embodiment and each modification example can be combined as appropriate as long as there is no contradiction.

In a case where all of documents, patent applications, and technical standard described in the specification are incorporated in the specification as references, to the same degree as a case where the incorporation of each of documents, patent applications, and technical standard as references is specifically and individually noted.

What is claimed is:

1. An information processing device that reconstructs an original image including an interference fringe image of at least one object to be observed, the information processing device comprising:

at least one processor that is configured to:

acquire local area information representing a local area that is an area in the original image including the interference fringe image, wherein the local area information represents a position and size of the local area;

generate a reconstructed image while changing a reconstruction position in the local area;

calculate sharpness of the reconstructed image each time the reconstructed image is generated and detect an in-focus position where the sharpness is maximized;

output the reconstructed image at the in-focus position as an optimal reconstructed image; and in a case where the acquired local area information includes a plurality of the local areas, output the optimal reconstructed image for each of the local areas, and wherein the processor is further configured to:

in a case where a plurality of the in-focus positions is detected for one local area, output a plurality of the optimal reconstructed images for the one local area.

2. The information processing device according to claim 1, wherein the processor is configured to:

dispose the output optimal reconstructed image for each local area in a reference image to generate a whole image.

3. The information processing device according to claim 2, wherein the reference image is the original image, and the processor is configured to:

dispose the optimal reconstructed image in the corresponding local area in the original image to generate the whole image.

4. The information processing device according to claim 1, wherein the processor is configured to:

generate the reconstructed image based on an imaging condition under which the original image is captured.

5. The information processing device according to claim 4, wherein the imaging condition includes a wavelength of irradiation light with which the object to be observed is irradiated.

6. The information processing device according to claim 4, wherein the imaging condition includes a position of the object to be observed.

7. The information processing device according to claim 1, wherein the processor is configured to:

start the reconstruction from an initial position and end the reconstruction in a case where one in-focus position is detected.

8. The information processing device according to claim 1, wherein the processor is configured to:

acquire the local area information based on a setting operation of a user.

9. The information processing device according to claim 1, wherein the processor is configured to:

perform image analysis based on the original image to acquire the local area information.

10. A method of operating an information processing device that reconstructs an original image including an interference fringe image of at least one object to be observed, the method comprising:

acquiring local area information representing a local area that is an area in the original image including the interference fringe image, wherein the local area information represents a position and size of the local area;

generating a reconstructed image while changing a reconstruction position in the local area;

calculating sharpness of the reconstructed image each time the reconstructed image is generated by the reconstruction processing to detect an in-focus position where the sharpness is maximized;

outputting the reconstructed image at the in-focus position as an optimal reconstructed image; and in a case where the acquired local area information includes a plurality of the local areas, outputting the optimal reconstructed image for each of the local areas, and in a case where a plurality of the in-focus positions is detected for one local area, output a plurality of the optimal reconstructed images for the one local area.

11. A non-transitory storage medium storing an operation program that causes a computer to execute reconstruction processing of an original image including an interference fringe image of at least one object to be observed, the reconstruction processing comprising:

acquiring local area information representing a local area that is an area in the original image including the interference fringe image, wherein the local area information represents a position and size of the local area;

generating a reconstructed image while changing a reconstruction position in the local area;

calculating sharpness of the reconstructed image each time the reconstructed image is generated by the reconstruction processing to detect an in-focus position where the sharpness is maximized;

outputting the reconstructed image at the in-focus position as an optimal reconstructed image; and in a case where the acquired local area information includes a plurality of the local areas, outputting the optimal reconstructed image for each of the local areas, and in a case where a plurality of the in-focus positions is detected for one local area, output a plurality of the optimal reconstructed images for the one local area.

\* \* \* \* \*